US012331580B1

(12) United States Patent
Marovets et al.

(10) Patent No.: US 12,331,580 B1
(45) Date of Patent: *Jun. 17, 2025

(54) DAMPED DOOR CLOSER SYSTEM AND METHOD

(71) Applicant: ANDERSEN CORPORATION, Bayport, MN (US)

(72) Inventors: Mitchell Marovets, Waukee, IA (US); Michael Wingert, Dallas Center, IA (US); Jesse Baldwin, Bondurant, IA (US); Kevin Kappelmann, Monroe, IA (US); Chris Hilligas, Mesa, AZ (US); Peter Haugh, Des Moines, IA (US)

(73) Assignee: Andersen Corporation, Bayport, MN (US)

( * ) Notice: Subject to any disclaimer, the term of this patent is extended or adjusted under 35 U.S.C. 154(b) by 27 days.

This patent is subject to a terminal disclaimer.

(21) Appl. No.: 18/198,359

(22) Filed: May 17, 2023

Related U.S. Application Data

(63) Continuation of application No. 17/379,095, filed on Jul. 19, 2021, now Pat. No. 11,680,434.

(Continued)

(51) Int. Cl.
*E05F 3/10* (2006.01)
*E05F 3/12* (2006.01)

(52) U.S. Cl.
CPC ................ *E05F 3/104* (2013.01); *E05F 3/12* (2013.01); *E05Y 2201/21* (2013.01);
(Continued)

(58) Field of Classification Search
CPC ..... Y10T 16/56; Y10T 16/577; Y10T 16/585; Y10T 16/27; Y10T 16/2804; Y10T 16/281; Y10T 16/285; Y10T 16/286; Y10T 16/293; Y10T 16/299; Y10T 16/61; Y10T 16/62; Y10T 16/2769; Y10T 16/2796; E05F 3/00; E05F 3/02; E05F 3/04; E05F 3/102; E05F 3/104; E05F 3/10; E05F 3/12; E05F 3/227; E05F 5/06; E05F 5/08; E05F 5/10; E05F 2003/228; E05C 17/04; E05C 17/28; E05C 17/20; E05Y 2201/21; E05Y 2201/246; E05Y 2201/256; E05Y 2201/264; E05Y 2201/474; E05Y 2201/638; E05Y 2900/132

See application file for complete search history.

(56) References Cited

U.S. PATENT DOCUMENTS 1,966,956 A * 7/1934 Dunn ...................... E05F 5/027 16/80
3,072,954 A * 1/1963 Patriquin .................. E05F 3/02 277/346

(Continued)

FOREIGN PATENT DOCUMENTS

CN 102906363 A 1/2013 .............. E05F 3/104
CN 205047005 U 2/2016

(Continued)

*Primary Examiner* — Chuck Y Mah
(74) *Attorney, Agent, or Firm* — Mueting Raasch Group

(57) ABSTRACT

Damped door closer systems, door assemblies including the damped door closer systems, and methods of operating damped door closer systems. The damped door closer systems include a closer assembly and damping assembly connected to each other through a connecting arm.

9 Claims, 14 Drawing Sheets

Related U.S. Application Data

(60) Provisional application No. 63/054,464, filed on Jul. 21, 2020.

(52) U.S. Cl.
CPC ... *E05Y 2201/246* (2013.01); *E05Y 2201/256* (2013.01); *E05Y 2201/264* (2013.01); *E05Y 2201/474* (2013.01); *E05Y 2201/638* (2013.01); *E05Y 2900/132* (2013.01)

(56) References Cited

U.S. PATENT DOCUMENTS

| | | | | | |
|---|---|---|---|---|---|
| 3,593,367 | A | 7/1971 | Waldo | E05F 3/02 | 16/66 |
| 3,781,943 | A | 1/1974 | Cain | E05F 3/108 | 188/317 |
| 4,148,111 | A * | 4/1979 | Lieberman | E05F 3/12 | 16/84 |
| 4,419,786 | A * | 12/1983 | Surko, Jr. | E05F 3/22 | 49/137 |
| 4,663,887 | A | 5/1987 | Storandt | E05F 5/12 | 49/369 |
| 4,763,384 | A * | 8/1988 | Watabe | E05F 3/104 | 16/53 |
| 5,170,530 | A | 12/1992 | Kopec | E05F 3/108 | 188/316 |
| 5,337,448 | A | 8/1994 | Brown | E05F 3/104 | 16/284 |
| 5,450,651 | A | 9/1995 | Coleman | E05C 17/24 | 49/346 |
| 5,709,009 | A | 1/1998 | Lasson | F15B 21/06 | 16/48.5 |
| 5,901,992 | A | 5/1999 | Winkler | E05C 17/28 | 292/201 |
| 8,732,904 | B2 | 5/2014 | Busch | | |
| 8,763,204 | B2 * | 7/2014 | Inaguchi | E05F 5/003 | 16/82 |
| 8,806,715 | B2 | 8/2014 | Bienek et al. | | |
| 8,819,895 | B2 | 9/2014 | Bienek | | |
| 8,826,494 | B2 | 9/2014 | Bienek et al. | | |
| 8,875,344 | B2 | 11/2014 | Salutzki et al. | | |
| 9,382,742 | B2 | 7/2016 | Wulbrandt | | |
| 9,447,622 | B2 | 9/2016 | Hellwig | | |
| 9,631,412 | B2 | 4/2017 | Hellwig et al. | | |
| 9,790,723 | B2 | 10/2017 | Bienek et al. | | |
| 2001/0007163 | A1 | 7/2001 | Alonso | E05F 3/108 | 16/49 |
| 2002/0066157 | A1 | 6/2002 | Chen | E05F 3/104 | 16/58 |
| 2003/0093872 | A1 | 5/2003 | Brown | E05F 3/104 | 16/66 |
| 2005/0125947 | A1 | 6/2005 | Kral | E05F 5/003 | 16/67 |
| 2016/0362924 | A1 | 12/2016 | Fan | E05F 5/08 | |
| 2017/0016260 | A1 * | 1/2017 | Pyo | F16F 9/19 | |
| 2017/0081892 | A1 | 3/2017 | Fan | E05F 3/10 | |
| 2017/0247922 | A1 | 8/2017 | Wang | E05F 1/1091 | |
| 2020/0408019 | A1 | 12/2020 | Vos | E05F 3/104 | |

FOREIGN PATENT DOCUMENTS

| | | | | | |
|---|---|---|---|---|---|
| CN | 206487275 | U | | 9/2017 | |
| DE | 202008005721 | U1 | | 8/2008 | E05F 3/104 |
| DE | 102011087695 | A1 | | 6/2013 | E05F 5/08 |
| DE | 202012101889 | U1 | | 7/2013 | E05F 15/63 |
| EP | 2169159 | A2 | | 3/2010 | E05C 17/28 |
| EP | 2921627 | A1 | | 9/2015 | E05F 3/104 |
| GB | 1103857 | A | * | 2/1968 | |
| JP | 11081788 | A | | 3/1999 | |
| KR | 1408768 | B1 | * | 6/2014 | E05F 3/00 |
| TW | 201219638 | A | | 5/2012 | E05F 3/102 |
| WO | WO-2015185462 | A1 | * | 12/2015 | E05F 3/10 |

* cited by examiner

DAMPED DOOR CLOSER SYSTEM AND METHOD

RELATED APPLICATION

This application is a continuation application of U.S. patent application Ser. No. 17/379,095, filed Jul. 19, 2021, which claims the benefit under 35 U.S.C. § 119 of U.S. Provisional Application No. 63/054,464, filed Jul. 21, 2020, and titled DAMPED DOOR CLOSER SYSTEM AND METHOD, the disclosures of which are incorporated herein by reference in their entireties.

Damped door closer systems, door assemblies including the damped door closer systems, and methods of operating damped door closer systems are described herein.

BACKGROUND

Door closers for door assemblies are used to facilitate closing of doors, particularly storm doors, after the doors have been opened. Typical door closers include pneumatic cylinders that span a gap between the door itself and the frame in which the door is mounted. Larger and/or heavier doors may employ a pair of door closers using pneumatic cylinders at the tops and bottoms of the doors to provide sufficient closing forces.

SUMMARY

Damped door closer systems, door assemblies including the damped door closer systems, and methods of operating damped door closer systems are described herein.

The damped door closer systems described herein perform a variety of functions associated with door closers including, e.g., limited impact in the force required to open the door, controlling the closing speed at which a door closes, and/or controlling the forces applied to a door during the closing process to, for example, provide sufficient force to latch a door when in the closed position.

The damped door closer systems described herein may provide one or more advantages when compared to known door closing systems. For example, in one or more embodiments, the damped door closer systems described herein may provide a more consistent latching force as the door moves into its closed position within a door frame, may provide a smoother closing motion as compared to door closers that provide widely varying closing speeds during different portions of the closing process, and provide a user with an easy and consistent way to adjust the closing speed of the door closer.

To accomplish one or more of these advantages, the damped door closer systems described herein combine a hydraulic assembly providing the forces needed to close and latch a door with a separate damping assembly providing damping to control the speed at which the door closes. That combination of separate hydraulic and damping assemblies provides the opportunity to combine the enhanced ability of hydraulic assemblies to store energy during the opening of a door and return that energy to close and latch the door with separate damping assemblies that can be adjusted to control the speed at which the door closes without requiring adjustments to the hydraulic assembly that could, e.g., reduce the force applied to close and latch the door. In one or more embodiments the damping assemblies may be pneumatic assemblies that are easily adjusted and not subject to the fluid leakage associated with some adjustable hydraulic assemblies.

In one or more embodiments, the damped door closer systems may also provide an opportunity to locate one or both of the hydraulic assemblies and damping assemblies in existing components to provide a cleaner appearance as well as protect the components of the damped door closer systems described herein. In particular, in one or more embodiments, the hydraulic assemblies may be contained in the door panel while the damping assemblies may be contained in the head jambs or other frame components mounted on a perimeter of an opening in which the door assembly is installed. Locating the adjustable damping assembly in a head jamb or other frame component at the top of the building opening in which a door assembly is located may facilitate access to the adjustment mechanism by a user without requiring the use of ladders, stools, etc. that may be associated with adjustment mechanisms found on the top edge of, e.g., a door panel.

In one aspect, one or more embodiments of a door closer system as described herein includes a closer assembly; a damping assembly; and a connecting arm configured to connect the closer assembly to the damping assembly, the connecting arm extending from a first end to a second end along an arm axis, the first end of the connecting arm configured to rotate about a first end axis oriented transverse to the arm axis when the door closer system is installed in a door. In one or more embodiments, the closer assembly comprises: a cam attached to the first end of the connecting arm, the cam configured to rotate about the first end axis in synchrony with the first end of the connecting arm, the cam comprising a concave closed arc and a convex operating arc, wherein a locking point is located at a junction between the closed arc and the operating arc; a compression assembly comprising a housing defining a fluid chamber, wherein a spring, a closer piston, and hydraulic fluid are located in the fluid chamber, wherein the compression assembly comprises a roller operably attached to the closer piston, wherein the closer piston is biased towards the roller by the spring element along a compression axis extending through the fluid chamber, wherein the compression assembly is configured to bias the roller into contact with the cam, wherein the closer piston divides the fluid chamber into a spring chamber containing the spring and a roller chamber containing the roller, and further wherein the closer piston comprises a fixed orifice configured to allow the hydraulic fluid to flow between the spring chamber and the roller chamber as the closer piston moves within the fluid chamber, wherein rotation of the cam about the first end axis moves the roller and the closer piston towards and away from the spring resulting in a changing force exerted on the roller by the spring based on the rotational position of the cam relative to the first end axis. In one or more embodiments, the damping assembly comprises: a piston tube; a damper piston in the piston tube, the damper piston configured to move within the piston tube along a damping axis, a shoe attached to the damper piston and the second end of the connecting arm, the shoe configured to move along the damping axis, wherein the connecting arm is configured to rotate relative to the shoe about a second end axis extending through the second end of the connecting arm and the shoe; a metering valve configured to allow air to flow into and out of a metering volume in the piston tube, wherein the metering volume is defined by a location of the damper piston relative to the metering valve, wherein the metering volume increases when the damper piston moves within the piston tube towards the shoe and wherein the metering volume decreases when the damper piston moves within the piston tube away from the shoe, wherein the metering valve comprises an adjustable orifice configure to allow selective control of a rate of flow of air into and out of the metering volume through the metering valve, and a check valve configured to allow air to enter the metering volume through the check valve when the damper piston moves within the piston tube towards the shoe, and wherein the check valve is configured to limit air from leaving the metering volume through the check valve when the damper piston moves within the piston tube away from the shoe.

In one or more embodiments of the door closer systems described herein, the operating arc comprises a radius of curvature that increases when moving away from the locking point.

In one or more embodiments of the door closer systems described herein, the operating arc comprises a radius of curvature that continually increases when moving away from the locking point.

In one or more embodiments of the door closer systems described herein, an outer perimeter of the cam is symmetric about at least one axis in a plane that is transverse to the first end axis.

In one or more embodiments of the door closer systems described herein, the compression assembly comprises a filter located in the fluid chamber, the filter configured to limit passage of particles in the hydraulic fluid larger than a size of the fixed orifice. In one or more embodiments, the first filter is attached to the closer piston such that the first filter moves with the closer piston.

In one or more embodiments of the door closer systems described herein, the compression assembly comprises: a first filter located in the fluid chamber between the fixed orifice and the spring, the first filter configured to limit passage of particles in the hydraulic fluid larger than a size of the fixed orifice; and a second filter in the fluid chamber, wherein the fixed orifice is located between the first filter and the second filter, wherein the second filter is configured to limit passage of particles in the hydraulic fluid larger than a size of the fixed orifice. In one or more embodiments, the first filter is attached to the closer piston such that the first filter moves with the closer piston. In one or more embodiments, the second filter is attached to the closer piston such that the second filter moves with the closer piston. In one or more embodiments, the first filter is attached to the closer piston such that the first filter moves with the closer piston, and wherein the second filter is attached to the closer piston such that the second filter moves with the closer piston.

In one or more embodiments of the door closer systems described herein, the compression assembly comprises a compliance chamber located in the housing, the compliance chamber occupying a volume that decreases as the fluid pressure of the hydraulic fluid in the fluid chamber increases. In one or more embodiments, the volume occupied by the compliance chamber increases as the fluid pressure of the hydraulic fluid in the fluid chamber decreases.

In one or more embodiments of the door closer systems described herein, the compression assembly comprises a compliance chamber located in the housing, the compliance chamber occupying a volume that decreases as a fluid pressure of the hydraulic fluid in the fluid chamber increases and wherein the volume occupied by the compliance chamber increases as the fluid pressure of the hydraulic fluid in the fluid chamber decreases. In one or more embodiments, the compliance chamber comprises a gas in an enclosed chamber. In one or more embodiments, the spring of the compression assembly comprises a coil spring, and wherein the compliance chamber is located in a spring volume defined by the coil spring. In one or more embodiments, the compliance chamber comprises a compliance chamber tube, a spring located in the tube, and a compliance piston located in the tube, wherein the spring acts on the compliance piston and biases the compliance piston in a first direction, wherein movement of the compliance piston in the compliance tube changes the volume occupied by the compliance chamber. In one or more embodiments, the spring comprises a coil spring, and wherein the compliance chamber is located in a spring volume defined by the coil spring. In one or more embodiments, the compliance chamber comprises a compliance chamber tube, a spring located in the tube, a first compliance piston located in the tube, and a second compliance piston in the tube, wherein the spring acts on the first compliance piston and biases the first compliance piston in a first direction, wherein movement of the first compliance piston in the compliance tube changes the volume occupied by the compliance chamber, and wherein the spring acts on the second compliance piston and biases the second compliance piston in a second direction opposite the second direction, wherein movement of the second compliance piston in the compliance tube changes the volume occupied by the compliance chamber. In one or more embodiments, the spring of the compression assembly comprises a coil spring, and wherein the compliance chamber is located in a spring volume defined by the coil spring.

In one or more embodiments of the door closer systems described herein, the check valve is located on the damper piston.

In one or more embodiments of the door closer systems described herein, the damping assembly comprises a sliding shuttle operably attached to the damper piston, wherein the sliding shuttle is configured to increase resistance to air flow out of the metering volume when the damper piston is moving away from the shoe to reduce the metering volume.

In one or more embodiments of the door closer systems described herein, the damping assembly comprises: a sliding shuttle operably attached to the damper piston, wherein the sliding shuttle is configured to move towards the damper piston when the damper piston is moving away from the shoe to reduce the metering volume, and wherein the sliding shuttle is configured to move away from the damper piston when the damper piston is moving towards the shoe to increase the metering volume; wherein the check valve is located on the damper piston and comprises a ball valve; wherein the sliding shuttle comprises a ball actuator configured to contact a ball of the ball valve when the damper piston is moving away from the shoe to reduce the metering volume; and wherein the ball actuator is configured to be spaced from the ball of the ball valve when the damper piston is moving towards the shoe to increase the metering volume such that air can enter the metering volume through the check valve. In one or more embodiments, the sliding shuttle comprises a seal configured to generate friction with an interior surface of the piston tube such that the sliding shuttle resists movement within the piston tube.

In one or more embodiments of the door closer systems described herein, the metering valve of the damping assembly comprises a needle valve.

In one or more embodiments of the door closer systems described herein, the metering valve is located in a plug located at an end of the piston tube distal from the shoe.

In a second aspect, one or more embodiments of a door assembly as described herein may include: a door panel; a door frame configured to at least partially frame a building opening, the door frame assembly comprising a hinge side jamb, a latch side jamb, and a head jamb, wherein the door panel is configured to rotate about a door axis aligned with the hinge side jamb when the door frame and the door panel are assembled in a building opening, the door assembly comprising a closed configuration in which a latch side edge of the door panel is proximate the latch side jamb and an open configuration in which the door panel is rotated about the door axis such that the latch side edge of the door panel is spaced apart from the latch side jamb; and a door closer system configured to close the door panel when the door frame and the door panel are assembled in a building opening and the door panel is in an open configuration, wherein the door closer system comprises a closer assembly, a damping assembly, and a connecting arm configured to connect the closer assembly to the damping assembly, the connecting arm extending from a first end to a second end along an arm axis, the first end of the connecting arm configured to rotate about a first end axis oriented transverse to the arm axis. In one or more embodiments, the closer assembly comprises: a cam attached to the first end of the connecting arm, the cam configured to rotate about the first end axis in synchrony with the first end of the connecting arm, the cam comprising a concave closed arc and a convex operating arc, wherein a locking point is located at a junction between the closed arc and the operating arc; a compression assembly comprising a housing defining a fluid chamber, wherein a spring, a closer piston, and hydraulic fluid are located in the fluid chamber, wherein the compression assembly comprises a roller operably attached to the closer piston, wherein the closer piston is biased towards the roller by the spring element along a compression axis extending through the fluid chamber, wherein the compression assembly is configured to bias the roller into contact with the cam, wherein the closer piston divides the fluid chamber into a spring chamber containing the spring and a roller chamber containing the roller, and further wherein the closer piston comprises a fixed orifice configured to allow the hydraulic fluid to flow between the spring chamber and the roller chamber as the closer piston moves within the fluid chamber, wherein rotation of the cam about the first end axis moves the roller and the closer piston towards and away from the spring resulting in a changing force exerted on the roller by the spring based on the rotational position of the cam relative to the first end axis. In one or more embodiments, the damping assembly comprises: a piston tube, a damper piston in the piston tube, the damper piston configured to move within the piston tube along a damping axis, a shoe attached to the damper piston and the second end of the connecting arm, the shoe configured to move along the damping axis, wherein the connecting arm is configured to rotate relative to the shoe about a second end axis extending through the second end of the connecting arm and the shoe, a metering valve configured to allow air to flow into and out of a metering volume in the piston tube, wherein the metering volume is defined by a location of the damper piston relative to the metering valve, wherein the metering volume increases when the damper piston moves within the piston tube towards the shoe and wherein the metering volume decreases when the damper piston moves within the piston tube away from the shoe, wherein the metering valve comprises an adjustable orifice configure to allow selective control of a rate of flow of air into and out of the metering volume through the metering valve, and a check valve configured to allow air to enter the metering volume through the check valve when the damper piston moves within the piston tube towards the shoe, and wherein the check valve is configured to limit air from leaving the metering volume through the check valve when the damper piston moves within the piston tube away from the shoe.

In one or more embodiments of a door assembly as described herein, the closer assembly is attached to the door panel and the damping assembly is attached to the head jamb such that the shoe is configured to move along the head jamb between the latch side jamb and the hinge side jamb when the door panel is moved between the open configuration and the closed configuration.

In one or more embodiments of a door assembly as described herein, the compression assembly comprises: a first filter located in the fluid chamber between the fixed orifice and the spring, the first filter configured to limit passage of particles in the hydraulic fluid larger than a size of the fixed orifice; and a second filter in the fluid chamber, wherein the fixed orifice is located between the first filter and the second filter, wherein the second filter is configured to limit passage of particles in the hydraulic fluid larger than a size of the fixed orifice. In one or more embodiments, the first filter is attached to the closer piston such that the first filter moves with the closer piston, and wherein the second filter is attached to the closer piston such that the second filter moves with the closer piston.

In one or more embodiments of a door assembly as described herein, the compression assembly comprises a compliance chamber located in the housing, the compliance chamber comprising a gas in an enclosed chamber, the compliance chamber occupying a volume that decreases as a fluid pressure of the hydraulic fluid in the fluid chamber increases and wherein the volume occupied by the compliance chamber increases as the fluid pressure of the hydraulic fluid in the fluid chamber decreases; wherein the spring of the compression assembly comprises a coil spring, and wherein the compliance chamber is located in a spring volume defined by the coil spring.

In one or more embodiments of a door assembly as described herein, the damping assembly comprises: a sliding shuttle operably attached to the damper piston, wherein the sliding shuttle is configured to move towards the damper piston when the damper piston is moving away from the shoe to reduce the metering volume, and wherein the sliding shuttle is configured to move away from the damper piston when the damper piston is moving towards the shoe to increase the metering volume; wherein the check valve is located on the damper piston and comprises a ball valve; wherein the sliding shuttle comprises a ball actuator configured to contact a ball of the ball valve when the damper piston is moving away from the shoe to reduce the metering volume; and wherein the ball actuator is configured to be spaced from the ball of the ball valve when the damper piston is moving towards the shoe to increase the metering volume such that air can enter the metering volume through the check valve.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

It is noted that the term "comprises" and variations thereof do not have a limiting meaning where these terms appear in the accompanying description. Moreover, "a," "an," "the," "at least one," and "one or more" are used interchangeably herein.

The above summary is not intended to describe each embodiment or every implementation of the door closer systems, door assemblies including the door closer systems and methods of using the same as described herein. Rather, a more complete understanding of the invention will become apparent and appreciated by reference to the following Description of Illustrative Embodiments and claims in view of the accompanying figures of the drawing.

DESCRIPTION OF ILLUSTRATIVE EMBODIMENTS

Figure 1:
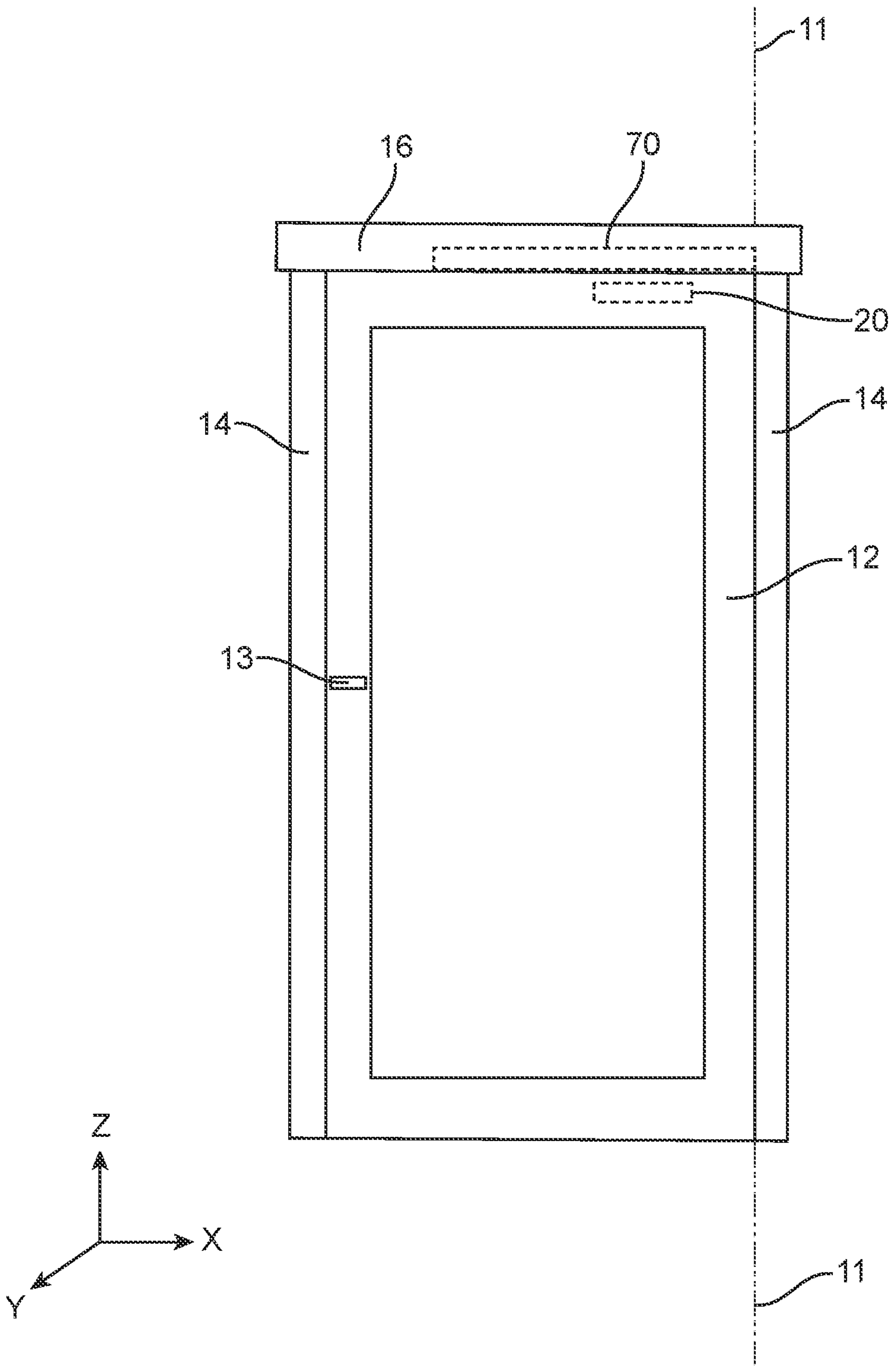
FIG. 1 is a front plan view of one illustrative embodiment of a door assembly including one illustrative embodiment of a damped door closer system as described herein.

In the following description of illustrative embodiments, reference is made to the accompanying figures of the drawing which form a part hereof, and in which are shown, by way of illustration, specific embodiments. It is to be understood that other embodiments may be utilized and structural changes may be made without departing from the scope of the present invention.

The damped door closer systems described herein combine a hydraulic closer assembly providing the forces needed to close and latch a door with a separate damping assembly providing damping to control the speed at which the door closes.

In one or more embodiments, one or both of the closer assemblies and damping assemblies may be located in existing components of a door and or door frame to provide a cleaner appearance as well as protect the components of the damped door closer systems described herein.

One illustrative embodiment of a door assembly including an illustrative embodiment of a door closer system as described herein is depicted in FIG. 1. The depicted door assembly 10 includes a door panel 12 located within a frame configured for mounting within a building opening. In the depicted embodiment, the doorframe includes side jambs 14 and a head jamb 16 spanning the top ends of the side jambs 14 as well as a top edge of the door panel 12. In one or more embodiments, the head jamb 16 may optionally function as a drip cap to control water contacting the top of the head jamb 16. Further, although described as a head jamb, the head jamb 16 may or may not offer any structural support to any other component of the door assembly 10 (other than the closer assembly or damping assembly as described herein). The depicted door panel 12 is hinged for rotation about door axis 11 which runs vertically along a hinge-side side jamb 14. The door panel 12 includes a latch 13 on a side of the door panel 12 opposite from the door axis 11 proximate a latch-side side jamb 14.

Figure 2:
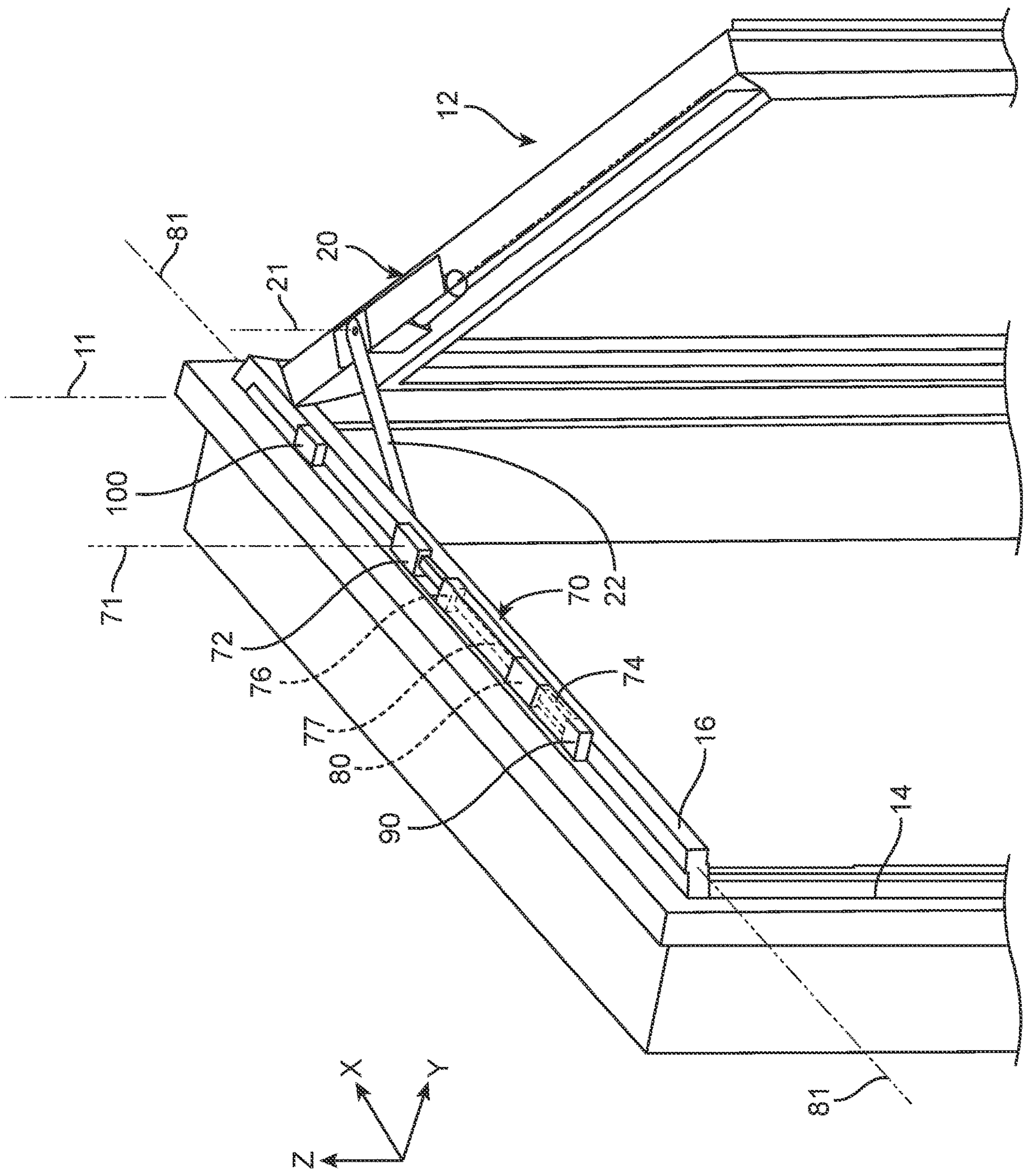
FIG. 2 is a top latch side perspective view depicting the door assembly of FIG. 1, with the door in a partially opened configuration.
Figure 3:
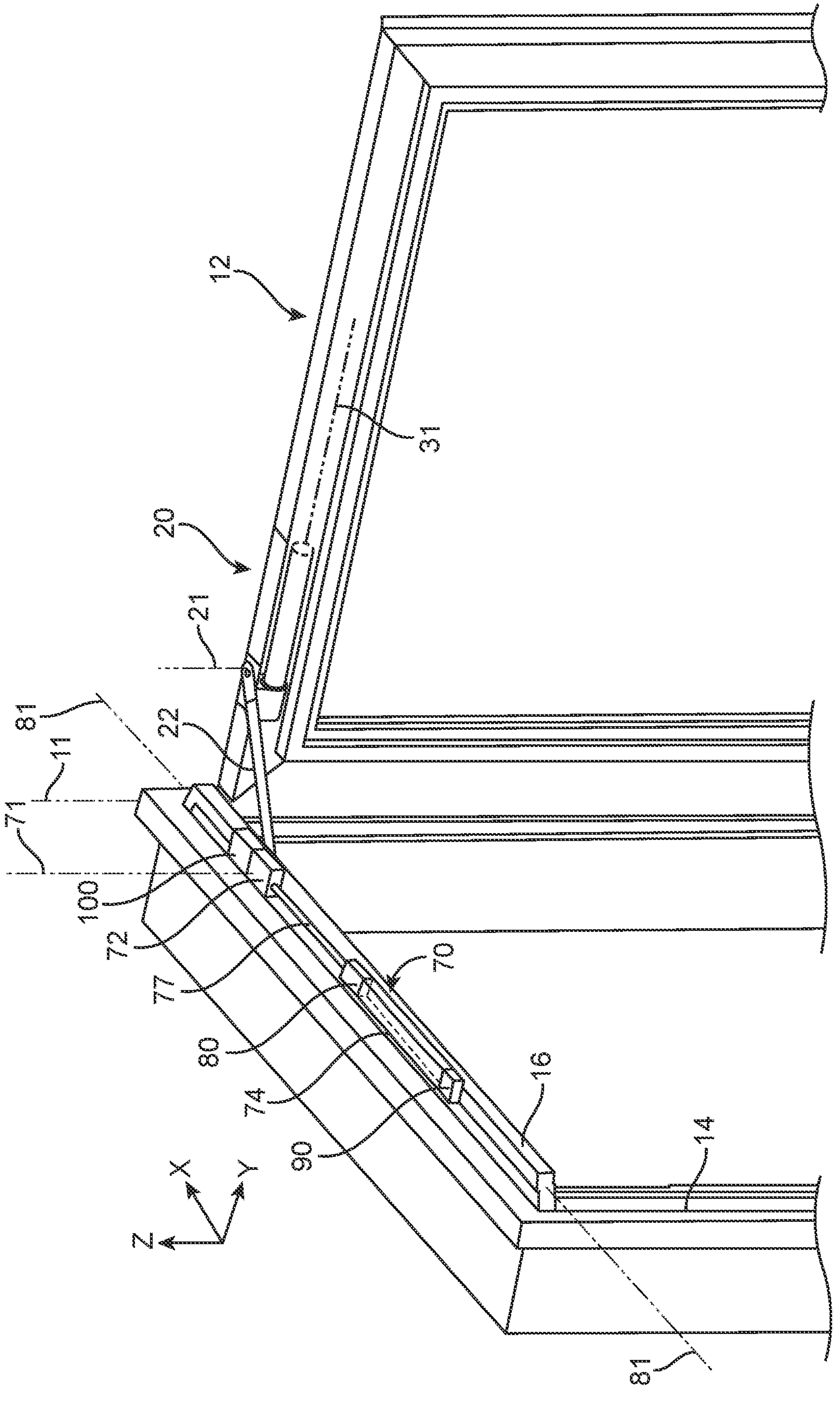
FIG. 3 is a view of the door assembly of FIG. 2 with the door in a fully open configuration.

The door assembly 10 includes a closed configuration in which a latch side edge of the door panel 12 (i.e., the edge of the door panel 12 adjacent the latch side jamb 14 in FIG. 1) is proximate the latch side jamb 14 and an open configuration in which the door panel 12 is rotated about the door axis 11 such that the latch side edge of the door panel 12 is spaced apart from the latch side jamb 14 (as depicted in FIGS. 2 and 3).

In the depicted embodiment of door assembly 10, a door closer system including a hydraulic closer assembly 20 and a damping assembly 70 are provided, with the hydraulic closer assembly 20 being located in or on the door panel 12 and the damping assembly 70 being located in or on the head jamb 16. This arrangement could, in one or more embodiments, be reversed, i.e., the damping assembly 70 may be provided in or on the door panel 12 while the hydraulic closer assembly 20 is provided in or on the head jamb 16.

While the door panel 12 is depicted in a closed position in FIG. 1, the door panel 12 is depicted in a partially open configuration in FIG. 2 and a fully open position in FIG. 3. All of FIGS. 1-3 include a Cartesian coordinate system for reference purposes.

With respect to FIG. 2, the door panel 12 is shown in a partially open configuration in which the door panel 12 is rotated about an arc of approximately 45° from its closed position in which the door panel is located between side jambs 14 and underneath head jamb 16 relative to the door axis 11. In FIG. 3, the door panel 12 is shown in a fully open configuration which the door panel 12 is rotated about an arc of approximately 90° from its closed position.

The door closer system as depicted in FIGS. 2-3 includes a hydraulic assembly 20 mounted in the door panel 12 and a damping assembly 70 mounted in the head jamb 16. The hydraulic assembly 20 and the damping assembly 70 are preferably hidden within the door panel 12 and head jamb 16, respectively. As a result, in each of FIGS. 2 and 3, the hydraulic assembly 20 and the damping assembly 70 are depicted in shadowed form within their respective structures.

Connecting arm 22 extends between the hydraulic closer assembly 20 and the damping assembly 70 and is used to transfer forces between the hydraulic closer assembly 20 and the damping assembly 70 to close the door panel 12. The connecting arm 22 extends from a first end connected to the hydraulic closer assembly 20 to a second end connected to the damping assembly 70. The first end of the connecting arm 22 rotates about a first end axis 21, while the second end of the connecting arm 22 rotates about a second end axis 71, during both opening and closing of the door panel 12. In one or more embodiments, the first end axis 21 and the second end axis 71 are aligned with each other as well as being aligned with the door axis 11.

Figure 4:
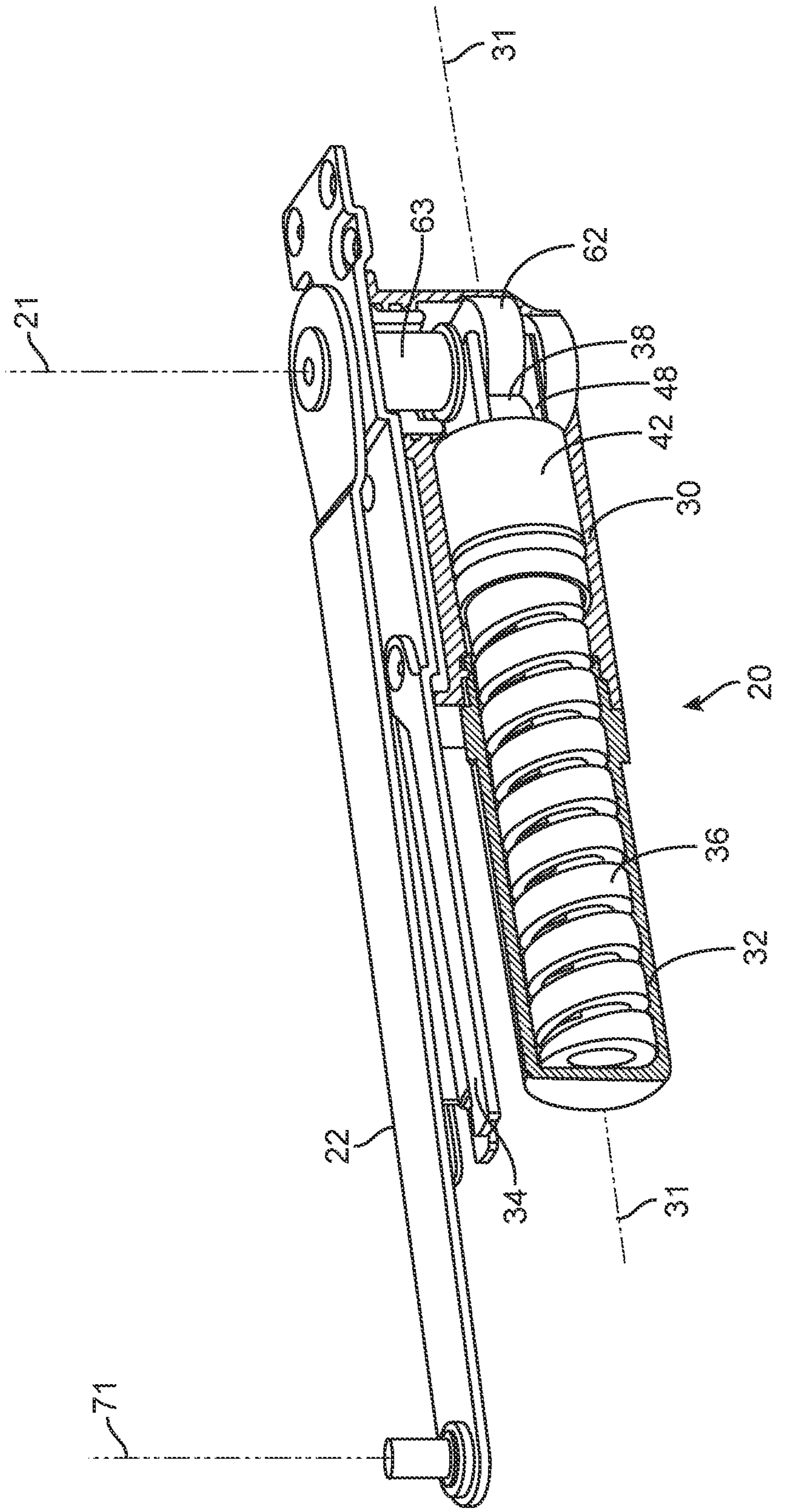
FIG. 4 is an enlarged perspective view of one illustrative embodiment of a hydraulic assembly and closing arm of a damped door closer system, with the housing components of the hydraulic assembly being partially removed to expose components within the hydraulic assembly.
Figure 5:
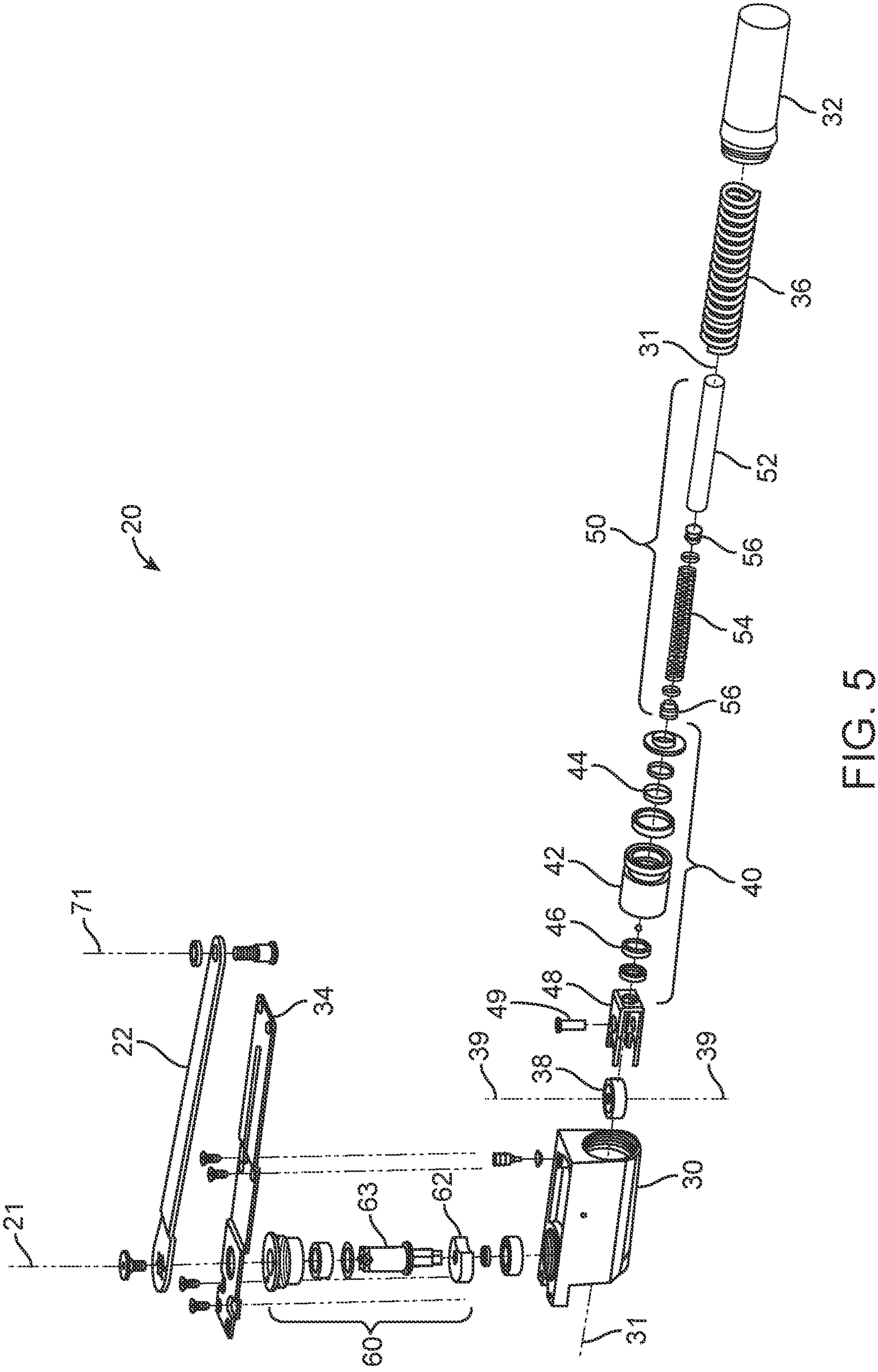
FIG. 5 is an exploded assembly diagram of components found in the illustrative embodiment of a hydraulic assembly as depicted in FIG. 4.

FIG. 4 depicts the hydraulic closer assembly 20 removed from the door panel 12 of FIGS. 1-3 and, further, with portions of the housing removed to expose the interior components of the hydraulic closer assembly 20 while FIG. 5 is an exploded assembly diagram of the hydraulic closer assembly 20.

With reference to both FIGS. 4-5, the housing of the hydraulic closer assembly 20 houses components of both a compression assembly as well as a cam 62 and the spindle 63 on which the cam 62 is mounted for rotation with the connecting arm 22 about first end axis 21 during both opening and closing of a door. The compression assembly operates on the cam to store energy during the opening of a door and then return that energy to the door to close the door after opening.

In the depicted illustrative embodiment, the housing includes a main compartment 30 and an auxiliary compartment 32 connected to the main compartment with both the main and auxiliary compartments 30 and 32 being connected to each other and sealed during the assembly process. Although the illustrative embodiment of the housing of closer assembly 20 is formed as a combination of the main and auxiliary compartments, will be understood that other closer assemblies could be provided in which the housing is a single unitary piece. The housing is retained within a door panel (or a frame if the closer assembly is mounted within a frame member as discussed herein) by a plate 34. The plate 34 is, in the depicted illustrative embodiments, visible in FIGS. 2-3 on the top edge of the door panel 12.

The housing defines a fluid chamber within the combined volumes of the main and auxiliary compartments 30 and 32, with a spring 36 and closer piston assembly 40 located within the fluid chamber defined by the housing along with hydraulic fluid. The closer piston assembly 40 includes a closer piston 42 and, in the depicted illustrative embodiment, a filter 44 located between the closer piston 42 and the spring 36 as well as a second filter 46 located on an opposite side of the closer piston 42 between the closer piston 42 and the roller 38. One or both of filters 44 and 46 may be useful to prevent clogging of an orifice located within the closer piston 42 as will be described herein (see, for example, the discussion regarding FIG. 11). Other components depicted as a part of the closer piston assembly 40 in the exploded assembly diagram of FIG. 5 are provided to transfer force between the spring 36 in the closer piston 42 along the compression axis 31, as well as maintain proper location of the various components within the housing of the closer assembly 20.

Also located within the housing of the closer assembly 20 are a roller 38 operably attached to the closer piston assembly 40 and, therefore, the closer piston 42 using, in the illustrative embodiment, a yoke 48 located on an opposite side of the closer piston 42 from the spring 36 along the compression axis 31. Roller 38 is retained within the yoke 48 using a pin 49.

The closer piston 42 is biased towards the roller 38 by the spring 36 along a compression axis 31 extending through the fluid chamber defined within the housing. As a result, the compression assembly is configured to bias the roller 38 into contact with the cam 62 within the housing of the closer assembly 20, with that contact between the roller 38 in the cam 62 being used to transfer energy into and out of the spring 36 during opening and closing of a door attached to the closer assembly 20. The spring 36 may, in one or more embodiments, be in the form of a square or rectangular wire coil spring to provide sufficient force to operate the closer assembly 20.

The cam 62 and spindle 63 on which the cam 62 is mounted form a part of a cam assembly 60 also located within the housing. As described herein, cam 62 and spindle 63 rotate about the first end axis 21 along with the first end of the connecting arm 22 during opening and closing of a door to which the closer assembly 20 is operably attached. In other words, rotation of the first end of the connecting arm 22 about the first end axis 21 causes corresponding rotation of the cam 62 and spindle 63 and vice versa. Although not specifically described herein, the other components depicted in the cam assembly 60 are provided to fix the positions of the cam 62 and spindle 63 within the main compartment of the housing 30 while allowing for rotation of the cam 62 and spindle 63 about the first end axis 21, as well as to seal the fluid chamber defined within the housing against leaks of hydraulic fluid during operation.

With reference to the exploded assembly diagram of FIG. 5, a compliance chamber 50 is also depicted as a part of the illustrative embodiment of closer assembly 20. The compliance chamber 50 is configured to occupy a volume that decreases as the fluid pressure of the hydraulic fluid in the fluid chamber increases due to, for example, an increase in temperature of the hydraulic fluid. The volume of the compliance chamber 50 conversely increases as the fluid pressure of the hydraulic fluid in the fluid chamber decreases due to, for example, cooling of hydraulic fluid in the fluid chamber. In essence, the compliance chamber 50 allows for expansion and contraction of the volume of hydraulic fluid in the housing of the closer assembly to reduce hydraulic fluid pressure within the closer assembly and, therefore, reduce the likelihood of leakage of hydraulic fluid out of the housing of the closer assembly 20.

Figure 12:
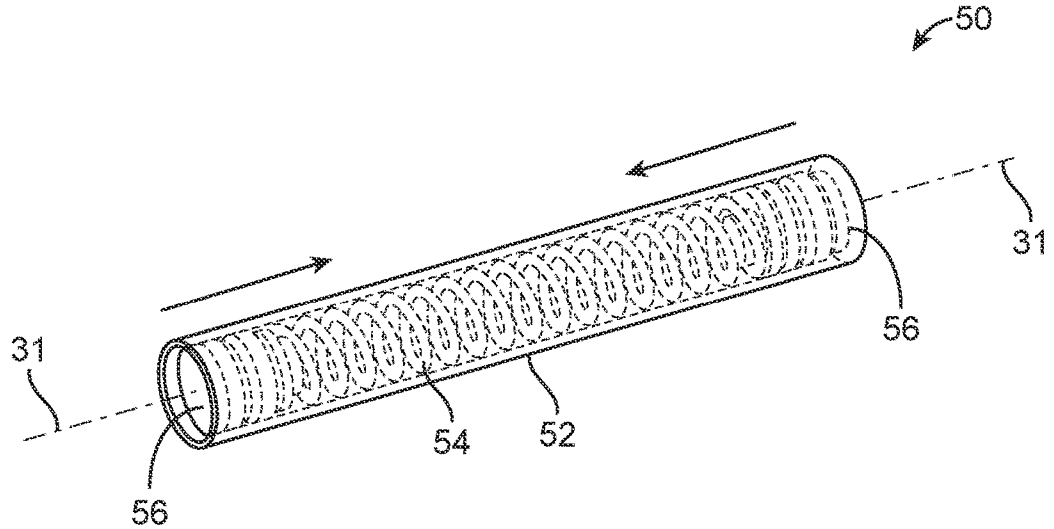
FIG. 12 is a partial cross-sectional view of one illustrative embodiment of a compliance chamber that may be used in one or more embodiments of a door closer system as described herein.

The compliance chamber 50 is, in the depicted illustrative embodiment of closer assembly 20, located within the interior of the spring 36 to reduce the overall size of the closer assembly 20. Other alternative embodiments of closer assemblies as described herein may, however, include compliance chambers in fluid communication with the fluid chamber of the housing of the closer assembly 20 that are not located within the spring 36 and/or may extend outwardly from the housing as needed. Further, any compliance chamber provided in connection with a hydraulic closer assembly as described herein may take any shape needed or desired for proper functioning, i.e., the compliance chamber need not be cylindrical. In one or more embodiments, the compliance chamber could take any suitable form such as, for example, a flexible bladder forming an enclosed volume within the fluid chamber, the enclosed volume increasing and decreasing in size as the fluid pressure within the fluid chamber changes). A more complete description of the depicted illustrative embodiment of compliance chamber 50 is provided below in connection with FIG. 12.

Figure 6:
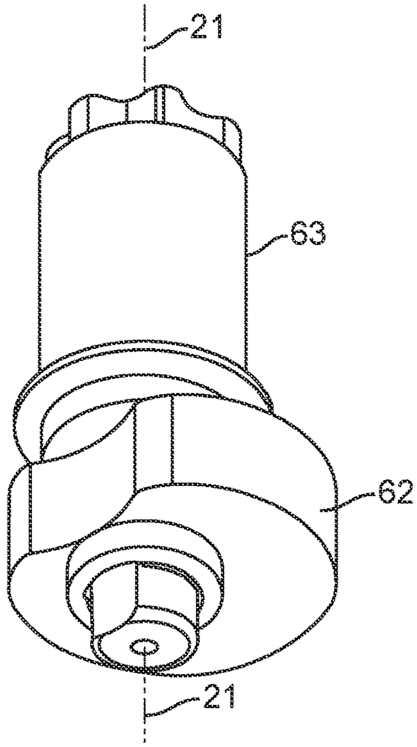
FIG. 6 depicts the cam and shaft on which the cam is mounted of the hydraulic assembly as depicted in FIGS. 4-5.

The cam 62 and spindle 63 of the closer assembly 20 are depicted in an enlarged view in FIG. 6 along with first end axis 21 about which the cam 62 and spindle 63 rotate during operation of the door closer systems described herein.

Figure 7:
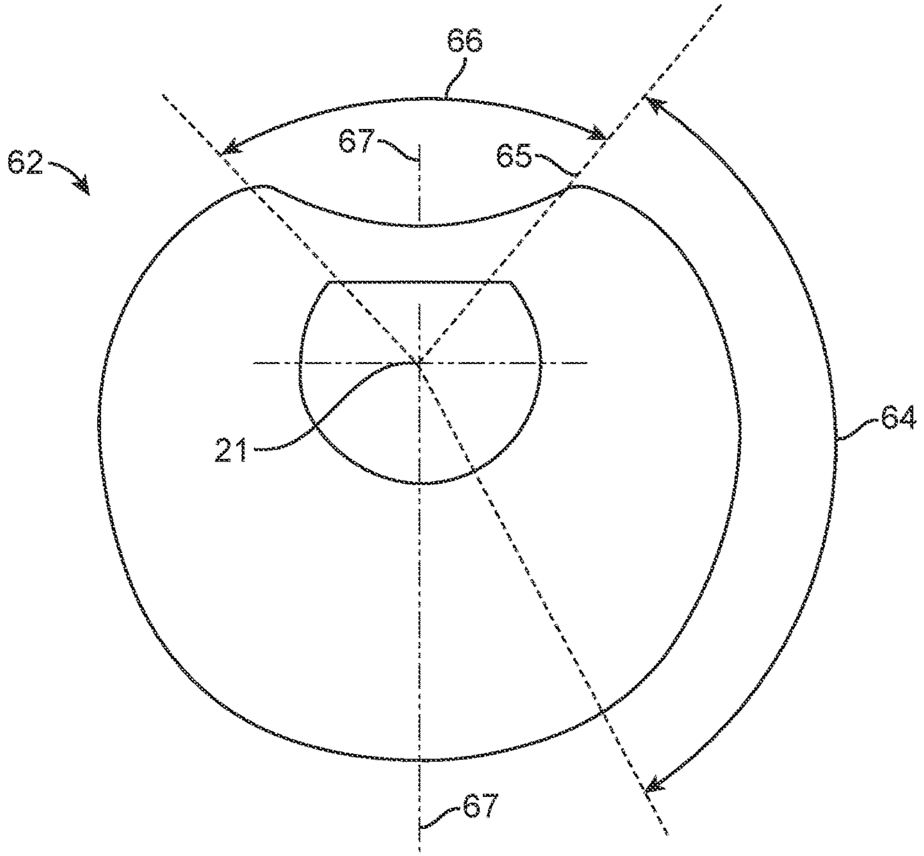
FIG. 7 is an enlarged plan view of one illustrative embodiment of a cam that may be used in a hydraulic assembly of a damped door closing system as described herein.

FIG. 7 is a view of the illustrative embodiment of cam 62 of closer assembly 20 taken along the first end axis 21 and can be used to describe various features on the cam 62. In particular, cam 62 includes a convex operating arc 64 and a concave closed arc 66. A locking point 65 is located at the junction between the convex opening arc 64 and concave closed arc 66. Although not required, the outer perimeter of the cam 62 is symmetric about line/axis 67 such that the cam 62 can be used on doors that are both left-hand and right-hand hinged without requiring any modification to the closing assembly 20 with respect to the position/location of the cam 62 in the closer assembly 20.

In one or more embodiments, the operating arc 64 may have a radius of curvature relative to the first end axis 21 that increases when moving away from the locking point 65. In one or more embodiments, the operating arc 64 may have a continually increasing radius of curvature when moving away from the locking point 65 with a continually increasing radius of curvature providing a consistent closing speed for a door being closed by the closer assembly 20.

Figure 8:
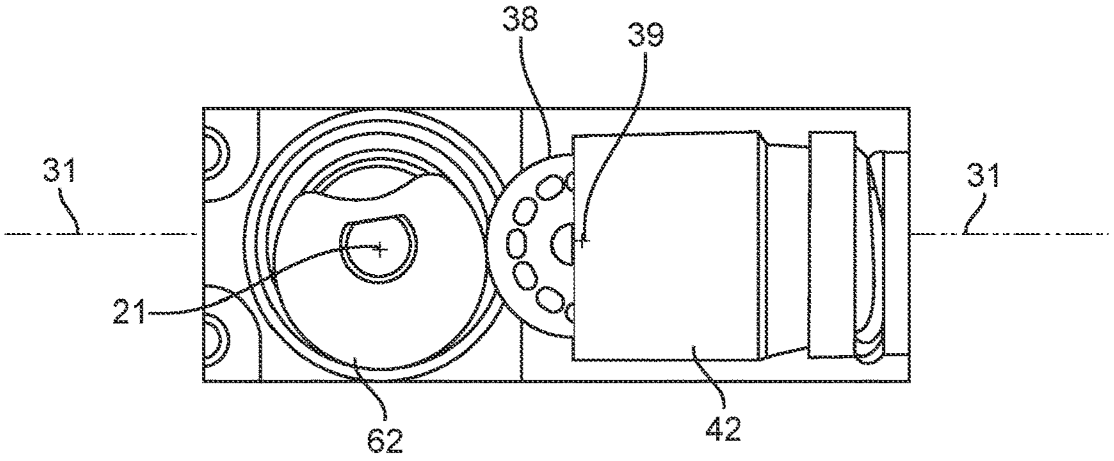
FIG. 8 is a top view of the cam of the hydraulic assembly depicted in FIGS. 4-7 along with a portion of the compression assembly used to provide the force required to close a door using the damped door closer systems described herein with the cam in a rotational position corresponding to a fully open configuration of a door as seen in, e.g., FIG. 3.
Figure 9:
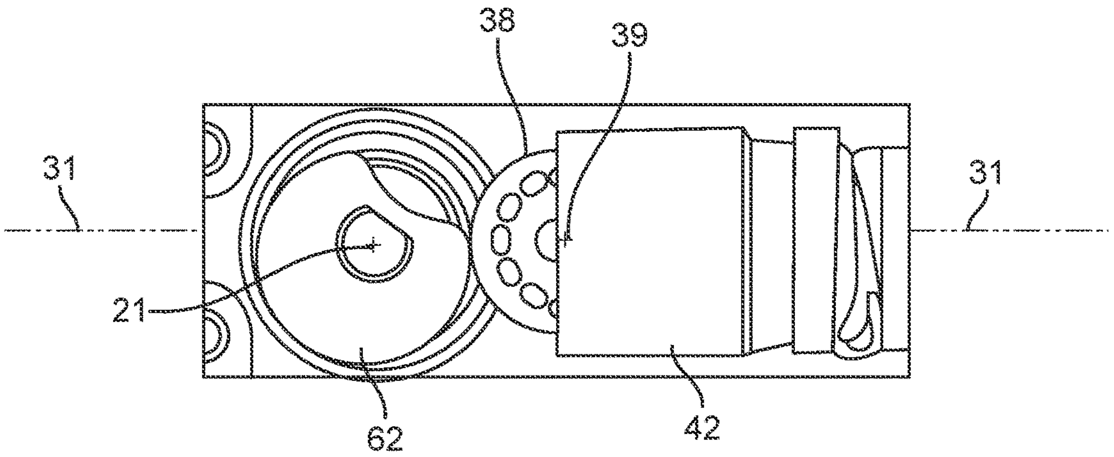
FIG. 9 is a top view of the cam and a portion of the compression assembly as depicted in FIG. 8 with the cam in a rotational position corresponding to a 45° opening of a door as seen in, e.g., FIG. 2.
Figure 10:
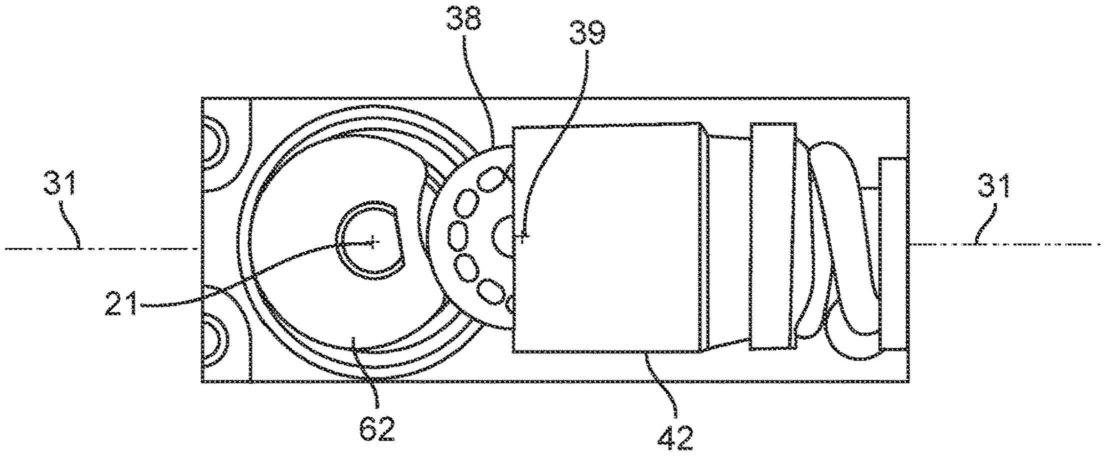
FIG. 10 is a top view of the cam and a portion of the compression assembly as depicted in FIG. 8 with the cam in a rotational position corresponding to a fully closed door as seen in, e.g., FIG. 1.

FIGS. 8-10 to depict interaction between the cam 62 and roller 38 of the compression assembly at various locations. In particular, FIGS. 8-10 depict the roller 38 in compression against the cam 62 along with closer piston 42 which applies a compression force on roller 38 along compression axis 31 as described herein. Roller 38 is, in the depicted illustrative embodiment, configured to rotate about roller axis 39 as cam 62 rotates about first end axis 21 as described herein.

FIG. 8 depicts the roller 38 on the operating arc (see, e.g., operating arc 64 in FIG. 7) of the cam 62 corresponding to, in one or more embodiments, a situation in which a door is in an open configuration as seen in, e.g., FIG. 3.

FIG. 9 depicts the roller 38 on the operating arc of the cam 62 corresponding to, in one or more embodiments, a situation in which a door is in a partially open configuration as seen in, e.g., FIG. 2.

FIG. 10 depicts the roller 38 on the closed arc (see, e.g., closed arc 66 in FIG. 7) of the cam 62 corresponding to, in one or more embodiments, a situation which a door is in a closed configuration as seen in, e.g., FIG. 1. As seen in FIG. 10, the roller 38 is only partially located within the concave closed arc when the door is in a closed configuration. Such an arrangement may, in one or more embodiments, provide an increased latching force to assist with latching of a door in its closed configuration as compared to a situation in which the roller 38 is completely nested within the concave closed arc and, further, may also provide a persistent latching force that assist with holding a door closed even after it has reached its closed configuration.

As described herein, the closer assembly 20 employs a spring 36 used to provide a compression force on roller 38, with that spring being used to store energy during opening of a door in which the closer system is mounted and to return that energy to close the door by urging the roller 38 against cam 62. The depicted illustrative embodiment of closer assembly 20 utilizes hydraulics to dampen the action of the closer assembly 20 during the closing process. In particular, the closer piston assembly 40 can be described as separating or dividing the fluid chamber along the compression axis 31 within the housing of closer assembly 20 into a spring chamber on one side of the closer piston 42 containing the spring 36 and a roller chamber containing the roller 38 on the opposite side of the closer piston 42.

In one or more embodiments, the closer piston 42 of the closer piston assembly 40 moves along the compression axis 31 within the housing of the closer assembly during opening and closing of a door and, as a result, the relative volumes of the hydraulic fluid located within the spring chamber and roller chamber of the housing changes as the position of the closer piston 42 changes. Those volumetric changes require the hydraulic fluid to flow through an orifice in the closer piston assembly 40 with that flow restriction controlling the delivery of energy from the spring 36 to the cam 62 during the closing process.

Figure 11:
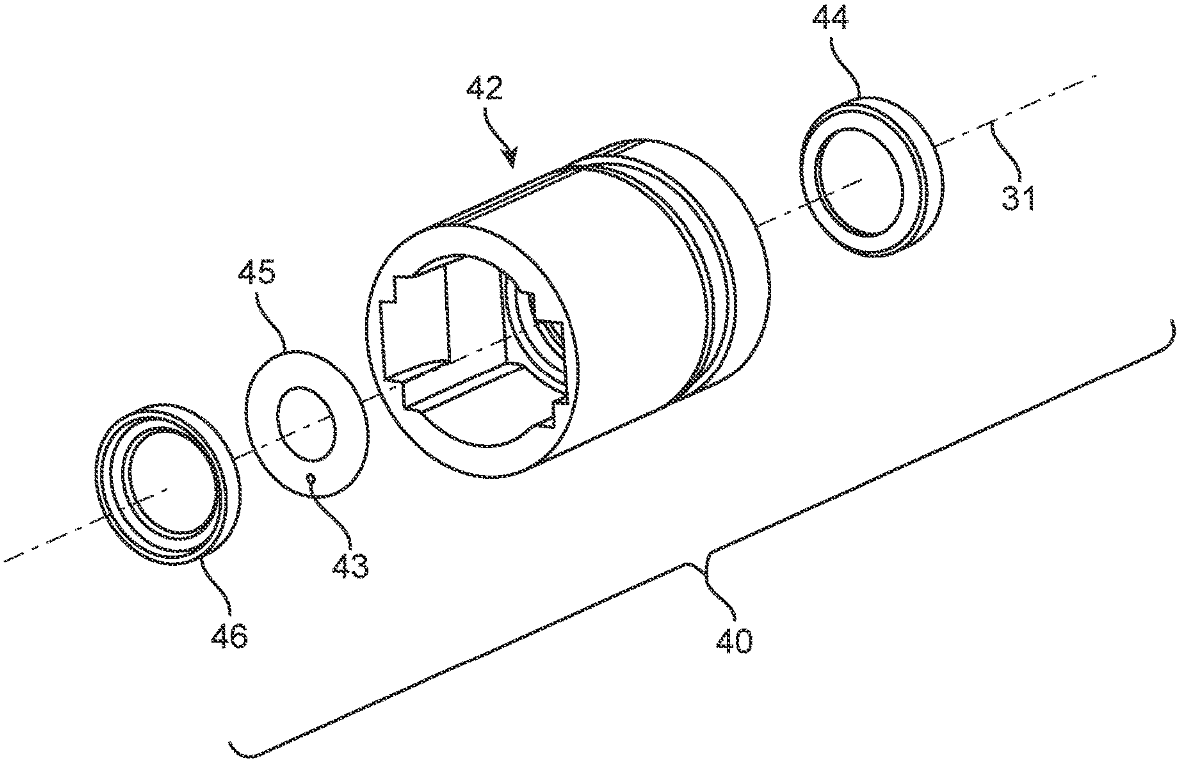
FIG. 11 is an exploded assembly view of one illustrative embodiment of a closer piston that may be used in one or more embodiments of a door closer system as described herein.

With reference to FIG. 11, one illustrative embodiment of a portion of the closer piston assembly 40 is depicted, with the depicted portion of the closer piston assembly 40 including a closer piston 42 comprising an opening along the direction of the compression axis 31 that allows hydraulic fluid to flow through the closer piston 42. Flow through the closer piston 42 is, however, restricted by a restrictor plate 45 that includes at least one fixed orifice 43 through which hydraulic fluid must flow when passing from the roller chamber to the spring chamber during the closing of a door using the closer assembly 20. With reference to the exploded assembly diagram of FIG. 5, the restrictor plate 45 and its corresponding fixed orifice 43 are not depicted because they are integral with the closer piston 42 (e.g., the restrictor plate 45 may be insert molded into the closer piston 42 and/or the fixed orifice 43 may be formed directly in the material used to form closer piston 42.

Regardless of the exact construction, the hydraulic fluid moving within the housing of closer assembly 20 between the roller chamber and the spring chamber as described herein is forced to move through a fixed orifice 43 which is not capable of being adjusted after the closer assembly is located within a door panel or other structure. The size of the fixed orifice 43 may be selected to provide the appropriate damping characteristics based on the other components within the closer assembly 20.

The closer piston assembly 40 depicted in both FIGS. 5 and 11 includes a pair of optional filters 44 and 46. During operation of the closer assembly 20, particles and other solid bodies may be formed in the hydraulic fluid for a variety of reasons, e.g., temperature variations, friction, contamination by water, shedding of particles from other components within the closer assembly, etc. One or both of the filters are preferably configured to limit the passage of particles in the hydraulic fluid located within the fluid chamber of the housing of closer assembly 22 avoid clogging or blocking of the fixed orifice 43. In particular, the filters may be configured to limit the passage of particles in the hydraulic fluid that are larger than the size of the fixed orifice.

Although the depicted illustrative embodiment includes a pair of filters 44 and 46, in one or more embodiments of closer assemblies as described herein, only one filter, e.g., filter 44, may be located in the fluid chamber of the housing between the fixed orifice 43 and the spring 36 where, for example, particle formation may be more likely to occur in such embodiments. In one or more alternative embodiments, only one filter, e.g., filter 46, may be located in the fluid chamber of the housing between the fixed orifice 43 and the cam 62 where, for example, particle formation may be more likely to occur in such embodiments.

In one or more embodiments, one or both of the filters 44 and 46 may be attached to the closer piston 42 such that one or both of the filters move with the closer piston 42 along the compression axis 31 during operation of the closer assembly as described herein. Attaching one or both of the filters 44 and 46 to the closer piston 42 may be advantageous in that the volume of fluid filtered may be reduced by locating one or both of the filters 44 and 46 in close proximity to the fixed orifice 43 and moving one or both of the filters 44 and 46 with the closer piston 42.

As discussed in connection with the exploded assembly diagram of FIG. 5, the depicted illustrative embodiment of closer assembly 20 also includes a compliance chamber 50. The compliance chamber 50 is shown in a partial cross-sectional view in FIG. 12 after assembly. In particular, the depicted illustrative embodiment of compliance chamber 50 includes a chamber tube 52 a spring 54 located within the chamber tube and a pair of compliance pistons 56 located at each end of the spring 54. When assembled, the components of the compliance chamber 50 are, in one or more embodiments, located within air or any other suitable gas that compresses or expands to provide the volumetric changes described above.

The compliance pistons 56 of the compliance chamber 50 include O-rings or other seal elements to prevent or at least limit the entry of hydraulic fluid into the interior of the chamber tube 52 and/or the escape of any gas located within the chamber tube 52 during movement of the compliance pistons 56 in response to pressure changes within the housing of the closer assembly 20.

Although the depicted illustrative embodiment of compliance chamber 50 includes a pair of compliance pistons 56, both of which are configured to move within the chamber tube 52, one or more alternative embodiments of compliance chambers may include only one compliance piston 56 configured to move to change the volume occupied by the compliance chamber 50.

As discussed above in connection with FIGS. 1-3, the door closer systems described herein include a damping assembly in combination with a hydraulic closer assembly, with the damping assembly being used to control the closing speed of the hydraulic closer assembly during closing of a door. One illustrative embodiment of a damping assembly is included in the illustrative embodiment of the door closer system of FIGS. 2-3.

Figure 13:
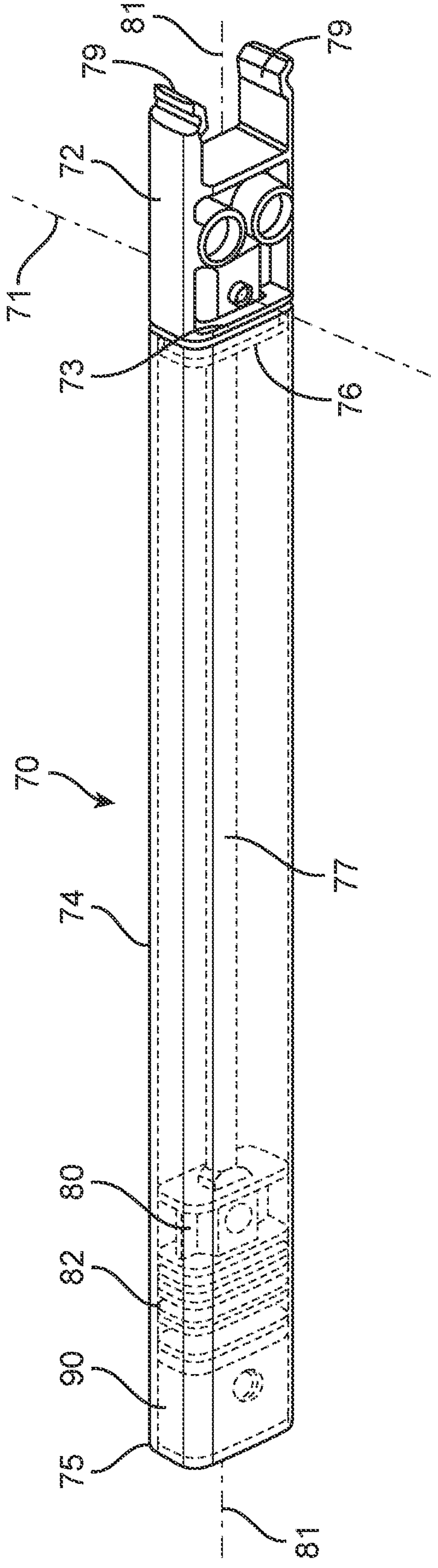
FIG. 13 is a partial cross-sectional view of one illustrative embodiment of a damping assembly that may be used in one or more embodiments of a door closer system as described herein.

The illustrative embodiment of the damping assembly 70 found in those figures is depicted after removal from the head jamb 16 in FIG. 13. The damping assembly 70 includes a shoe 72 that moves along a damping axis 81 generally aligned with the head jamb 16 as seen in FIGS. 2-3. As discussed herein, the second end of the connecting arm 22 is attached to the shoe 72, with the connecting arm 22 rotating relative to the shoe 72 about a second end axis 71 during closing of a door with which the damping assembly 70 is used.

The depicted illustrative embodiment of damping assembly 70 also includes a piston tube 74 which, in FIG. 13, is partially cut away to expose other components of the damping assembly 70 located within the piston tube 74. The piston tube 74 extends along the damping axis 81 and can be described as having a first end proximate the shoe 72 and a second end distal from the shoe 72, with the first end and the second end located along the damping axis 81. The piston tube 74 may preferably be contained in the head jamb 16 of door assemblies with which the door closer systems described herein are used. It should be understood, however, that the piston tube 74 and other components of the damping assembly could be mounted in an exposed configuration outside of the head jamb of a door assembly if desired.

A damper piston 80 is located within the piston tube 74, with the damper piston moving within the piston tube 74 along the damping axis 81. In the depicted illustrative embodiment, the damper piston 80 is attached to the shoe 72 by a shaft 77 extending between the damper piston 80 and the shoe 72. The depicted illustrative embodiment of damping assembly 70 also includes a guide 76 located at the first end of the piston tube, with the guide 76 used to control movement of the shaft 77 during movement of the shoe 72 and damper piston 80 during opening and closing of with which the damping assembly. Guide 76 may also limit entry of debris into the piston tube 74 that could interfere with proper sealing of the damper piston 80 within piston tube 74.

The damping assembly 70 also includes a metering valve configured to allow air to flow into and out of a metering volume in the piston tube 74. In the depicted illustrative embodiment of damping assembly 70, the metering valve may be provided in a plug 90 positioned proximate the second end 75 of the piston tube 74.

In the damping assembly 70, a metering volume is defined by a location of the damper piston 80 relative to the metering valve located in plug 90. The metering volume within the piston tube increases when the damper piston 80 moves within the piston tube 74 towards the shoe and the metering volume decreases when the damper piston 80 moves within the piston tube 74 away from the shoe 72 (it being understood that the actual distance between the damper piston 80 and the shoe 72 is fixed by shaft 77, with the shoe 72 being referenced only to describe the direction of travel of the damper piston 80 within the piston tube 74).

In the illustrative embodiment depicted in FIG. 13, the damper piston 80 is located in a position that defines a minimum metering volume because the shoe 72 abuts the guide 76 located at the first end of the piston tube 74 and the shaft 77 limits any further travel of the damper piston 80 towards the plug 90 containing the metering valve of the damping assembly 70.

With reference to FIG. 3, the damper piston 80 is located proximate the guide 76 at the first end of the piston tube 74, with the metering volume being defined by the distance between the damper piston 80 and plug 90 containing the metering valve of the damping assembly 70 this arrangement results in a metering volume having a maximum value because the distance between the damper piston 80 and the metering valve contained in plug 90 within the piston tube 74 is at a maximum and corresponds to a fully open door 12. In this arrangement, the damping assembly is set to dampen movement of the door panel 12 by the hydraulic closer assembly 22 control closing speed of the door 12.

With reference to FIG. 2, the damper piston 80 is located in an intermediate position within piston tube 74. This arrangement results in a metering volume having an intermediate value between the minimum metering value as seen in FIG. 13 and the maximum metering volume as seen in FIG. 3.

Control over airflow into and out of the metering volume is accomplished using both the metering valve described above as well as a check valve that is, in the depicted illustrative embodiment, located within damper piston 80. In particular, damper piston 80 includes a check valve configured to allow air to enter the metering volume when the damper piston 80 moves within the piston tube 74 towards the shoe 72.

Figure 14:
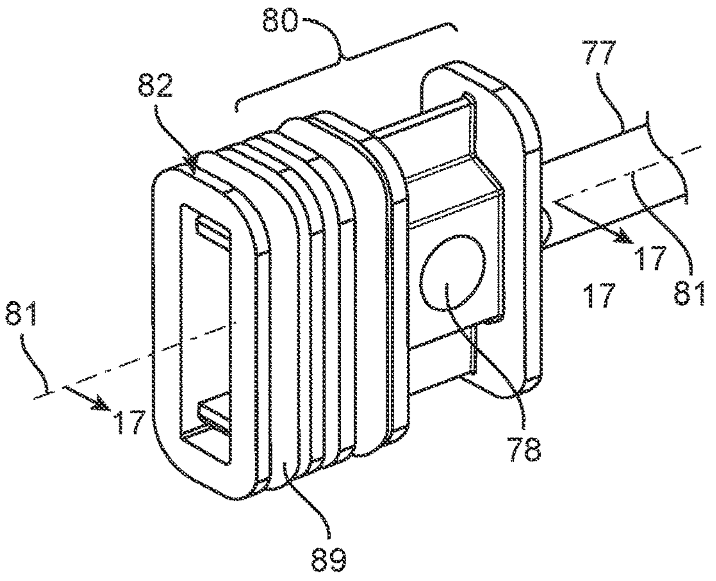
FIG. 14 is a perspective view of a damper piston and sliding shuttle operably attached to the damper piston that may be used in one or more embodiments of a damping assembly that may, in turn, be used in one or more embodiments of a door closer system as described herein.
Figure 15:
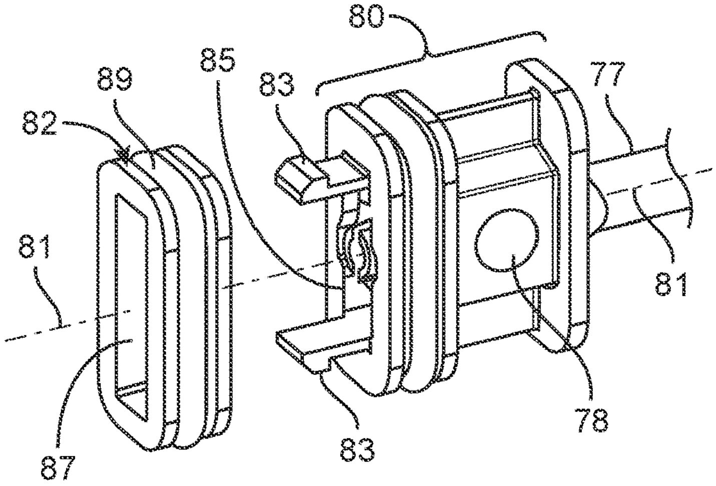
FIGS. 15-16 are perspective views of the damper piston and sliding shuttle of FIG. 14 before attachment of the sliding shuttle on the damper piston.
Figure 16:
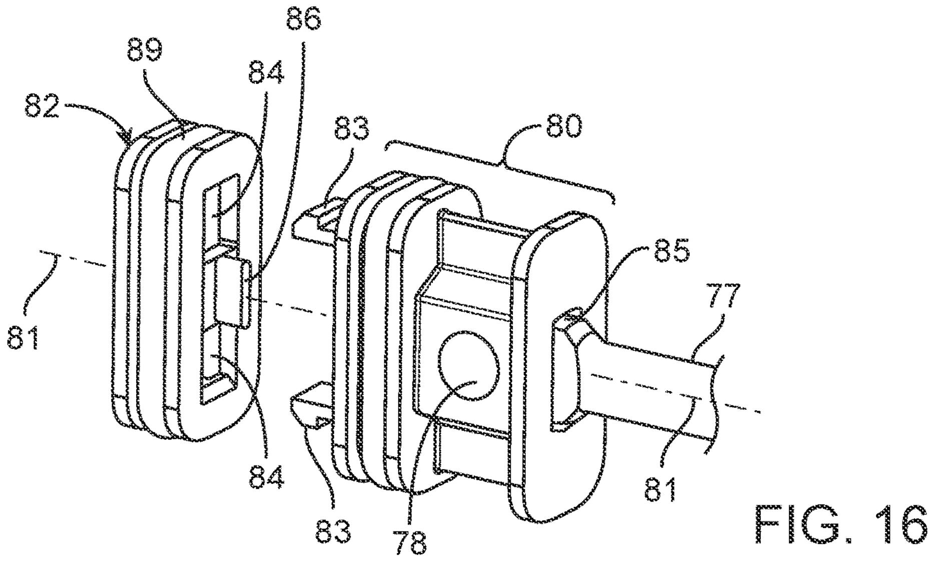

Referring to FIGS. 14-16, the depicted illustrative embodiment of damping assembly 70 includes, in addition to damper piston 80, a sliding shuttle 82 that is operably attached to the damper piston 80. The sliding shuttle 82 is configured to move towards the damper piston 80 when the damper piston is moving away from the shoe 72 to reduce the metering volume in piston tube 74. The sliding shuttle 82 is also configured to move away from the damper piston 80 when the damper piston 80 is moving towards the shoe 72 to increase the metering volume in the piston tube 74.

Although the sliding shuttle 82 is configured to move relative to the damper piston 80 as described herein, its movement is however limited. In particular, with reference to FIGS. 15-16, the sliding shuttle 82 is retained by the arms 83 on damper piston 80 that interlock with structures provided in cavities 84 on sliding shuttle 82. As a result, limited movement of the sliding shuttle 82 relative to the damper piston 80 is provided as the sliding shuttle 82 moves along retaining arms 83 on damper piston 80. Any alternative structure capable of providing such limited relative movement between the damper piston 80 and sliding shuttle 82 may be substituted for the specific structures depicted in FIGS. 15-16.

Figure 17:
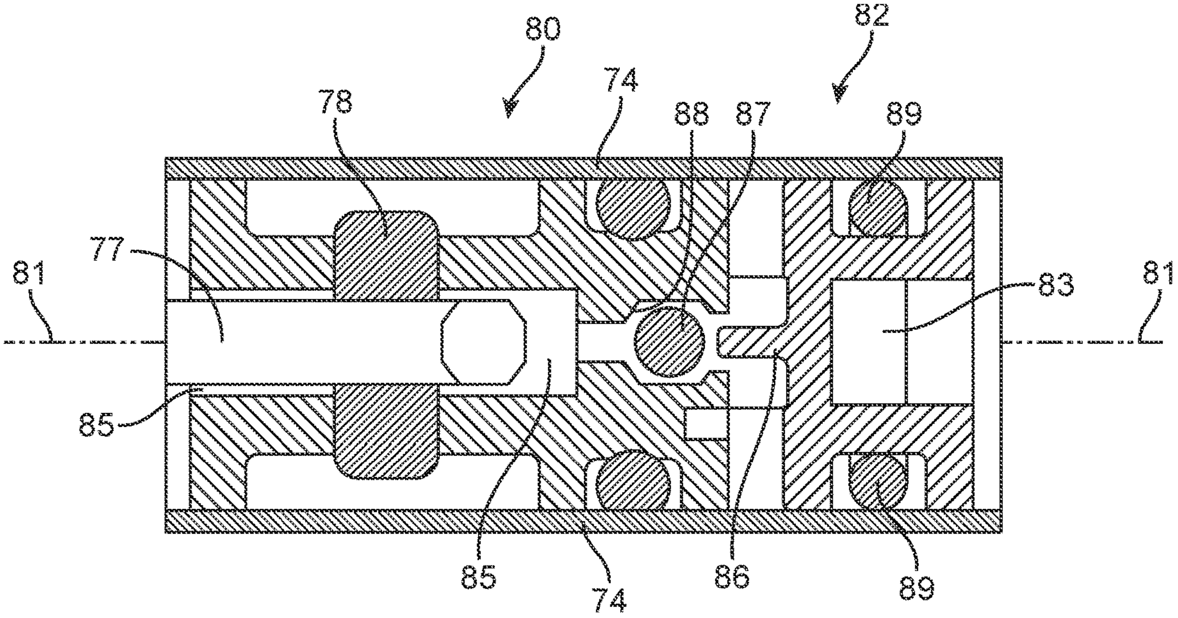
FIG. 17 is an enlarged cross-sectional view of the damper piston and sliding shuttle of FIG. 14 taken along line 17-17 in FIG. 14 in which the sliding shuttle is not acting on the ball of the check valve contained within the damper piston.
Figure 18:
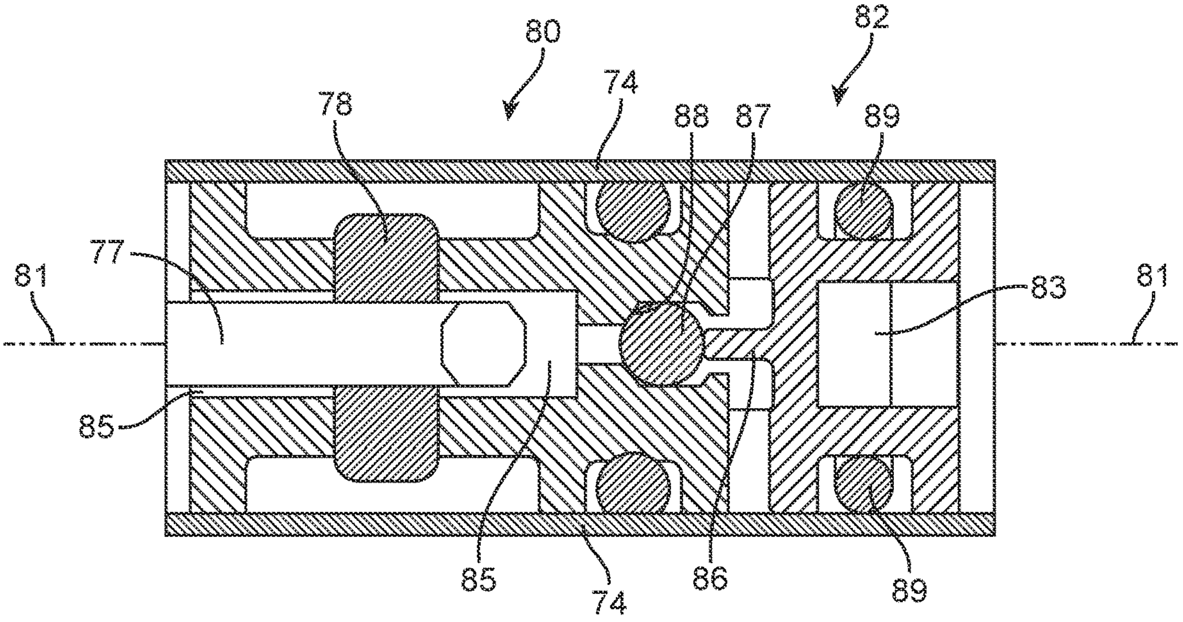
FIG. 18 is a cross-sectional view of the damper piston and sliding shuttle of FIG. 17 in which the sliding shuttle is acting on the ball of the check valve contained within the damper piston.

The interior structures of the damper piston 80 and sliding shuttle 82 are seen in the cross-sectional views of FIGS. 17-18 where FIG. 17 is a cross-sectional view taken along line 17-17 in FIG. 14. As seen in FIG. 17, shaft 77 connecting damper piston 82 shoe 72 as described herein terminates in a spade located within a cavity of the damper piston 80. That spade is secured within the damper piston 80 by a pin 78. The spade of shaft 77 does not, however, completely occupy the volume 85 of damper piston 80 in which it is located.

Damper piston 80 also includes a check valve which, in the depicted illustrative embodiment, is in the form of a ball valve including a seat 88 and a ball 87 sized to fit within the seat 88. Ball valve 87/88 allows air to pass through the cavity 85 of damper piston 80 towards the sliding shuttle 82, but limits or prevents air from passing in the opposite direction. As a result, ball valve 87/88 allows air to pass through the cavity 85 into the metering volume defined within piston tube 74 as the damper piston 80 moves towards shoe 72 (see, e.g., FIG. 13). Conversely, ball valve 87/88 limits or prevents air from passing through cavity 85 out of the metering volume defined within piston tube 74 as the damper piston 80 moves away from shoe 72 (see, e.g., FIG. 13). As a result, air passing out of the metering volume in piston tube 74 as the shoe 72 moves in a direction corresponding to closure of a door is forced through the metering valve (e.g., the metering valve located in plug 90) to control the closing speed of the door closer systems described herein.

Although the damping assembly may be operated solely using the check valve 87/88 located within damper piston 80, the addition of sliding shuttle 82 may enhance the closure of the check valve provided in the form of ball valve 87/88. To do so, the sliding shuttle includes a ball actuator 86 configured to contact the ball 87 of the ball valve 87/88 when the damper piston 80 is moving away from the shoe 72 to reduce the metering volume. That contact between the ball actuator 86 and the ball 87 of ball valve 87/88 is depicted in FIG. 18, where ball actuator 86 is in contact with ball 87 to force ball 87 against seat 88 to limit or prevent air from flowing through cavity 85 and damper piston 80 in the direction of the shaft 77.

Movement between the damper piston 80 and sliding shuttle 82 is also used to move the sliding shuttle 82 away from the damper piston 80 when the damper piston 80 is moving towards the shoe 72 to increase the metering volume. Moving the sliding shuttle away from the damper piston 80 in that scenario allows the ball 87 of check valve 87/88 to move away from seat 88 and allow air to pass through the cavity 85 of damper piston 80 and into the metering volume. In particular, air passing through cavity 85 of damper piston 80 also passes through cavity 84 provided in sliding shuttle 82 with that air entering the metering volume within the piston tube 74 as described herein.

Movement of the sliding shuttle 82 relative to the damper piston 80 is, in the depicted illustrative embodiment, provided by friction formed between the sliding shuttle 82 and the interior surface of the piston tube 74. In particular, that friction is provided by seal 89 on sliding shuttle 82, with seal 89 resisting movement of the sliding shuttle 82 within piston tube 74. Although the seal 89 depicted in FIGS. 14-18 is in the form of an O-ring, any suitable seal mechanism generating the desired friction could be substituted such as, e.g., one or more fin seals, etc.

Although the depicted embodiment of sliding shuttle 82 includes a ball actuator 86 configured to enhance the closure of the check valve 87/88, in one or more embodiments, the sliding shuttle may, itself, include a check valve such that air must pass through the check valve 87/88 in damper piston 80 as well as a check valve located in the sliding shuttle 82 to enter the metering volume during operation as described herein.

Figure 19:
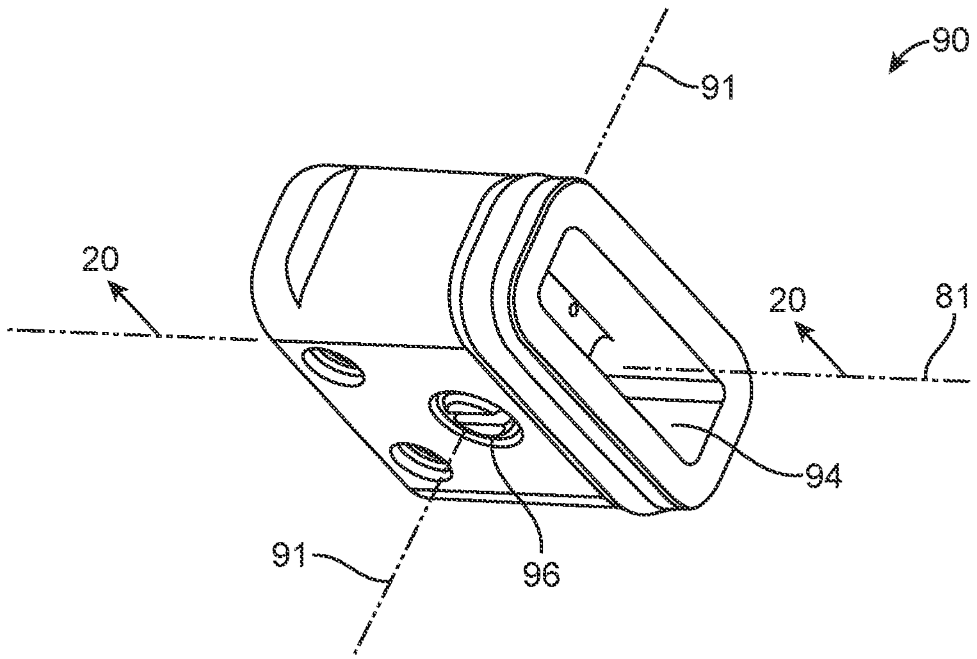
FIG. 19 is a perspective view of one illustrative embodiment of a plug containing a metering valve found in the piston tube of the damping assembly depicted in FIG. 13.
Figure 20:
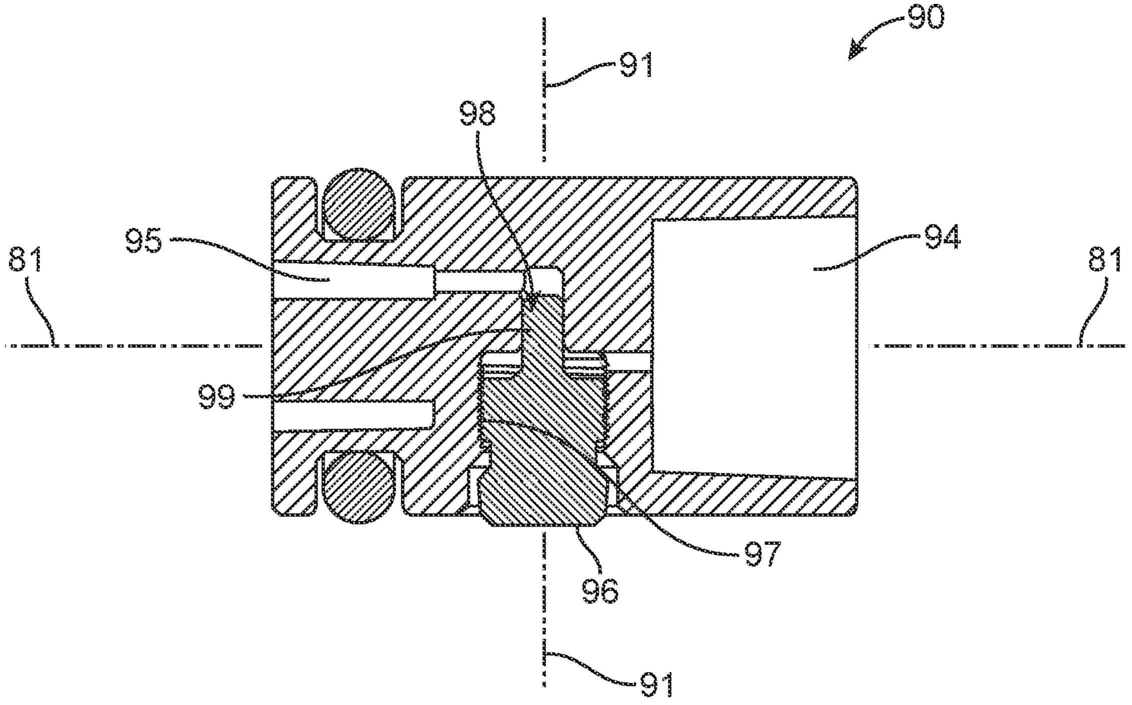
FIG. 20 is an enlarged cross-sectional view of the plug and metering valve depicted in FIG. 19, the view taken in a cross-sectional plane defined by axes 81 and 91 depicted in FIG. 19.

One illustrative embodiment of a plug that may be used to provide a metering valve configured to control the flow of air out of a metering volume defined within the piston tube of the damping assemblies described herein is depicted in FIGS. 19-20. The plug 90 may, as seen in, e.g., FIGS. 2-3 and 13, be located at an end of the piston tube 74 that is distal from the shoe 72. It is preferred that plug 90 seal the end of the piston tube 74 such that air passing out of the metering volume during closing of a door must pass through the metering valve.

Plug 90 includes ports 94 and 95 on opposite sides of the plug 90 with ports 94 and 95 being in fluid communication with a tapered cavity 98 provided in the plug 90. The metering valve also includes a threaded body 96 located within a body cavity 97 in plug 90, with the body cavity 97 being threaded such that rotation of the threaded body 96 within the body cavity 97 about valve axis 91 moves a tapered plunger 99 into or out of the tapered cavity 98 to increase or decrease the size of a gap between the plunger 99 and cavity 98. That gap size controls flow through the metering valve and is used to control the rate of flow out of the metering valve during the closing process using the damper assemblies described herein.

Although the depicted illustrative embodiment of the damping assembly includes a metering valve in the form of a needle valve, other adjustable metering valve assemblies could be substituted such as, e.g., butterfly valves, ball valves, gate valves, globe valves, etc. if those valve assemblies provide sufficient control over the flow of air out of the metering volume as described herein.

Although the depicted illustrative embodiment of damping assembly 70 includes a check valve mounted on the damper piston 80 and a metering valve located in plug 90 closing off an end of the piston tube 74, many other arrangements of these components in damping assemblies that can be used in one or more embodiments of door closer systems described herein may be used.

Figure 21:
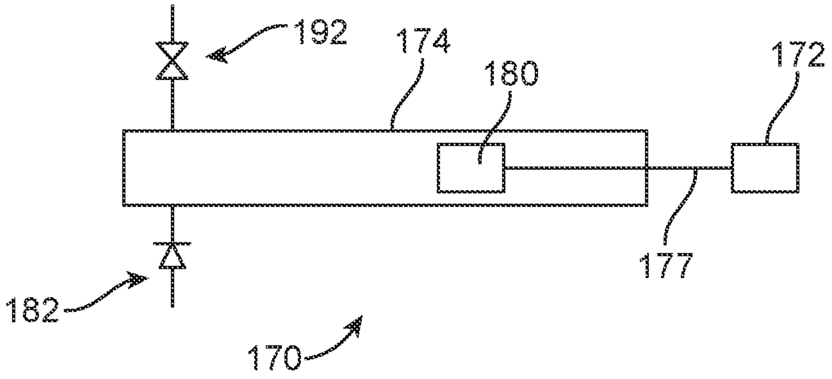
FIG. 21 is a schematic diagram of one illustrative alternative embodiment of a damping assembly that may be used in one or more embodiments of a door closer system as described herein.

FIG. 21 is a schematic diagram depicting one alternative arrangement of these components in a damping assembly 170. As depicted in FIG. 21, the damping assembly 170 includes a piston tube 174 and a damper piston 180 located within the volume of the piston tube 174. The damper piston 180 is connected to a shoe 172 by a connector 177 such that movement of the shoe 172 causes corresponding movement of the damper piston 180 within piston tube 174 two increase and decrease the metering volume defined within the piston tube 174.

Also included in alternative damping assembly 170 is a check valve 182 configured to allow air to enter the metering volume in the piston tube 174 when the damper piston 180 moves towards the shoe 172 to increase the metering volume within piston tube 174. A metering valve 192 is also included in the alternative damping assembly 170 and is configured to allow air to flow into and out of the metering volume in the piston tube 174 as the damper piston 180 moves within the piston tube 174.

Among the differences between the illustrative embodiment of damping assembly 70 in the alternative embodiment of damping assembly 170 is that the check valve 182 is not located on the damper piston 180 but, rather, feeds directly into the metering volume defined within the piston tube 174. Similarly, the metering valve 192 is not located on an end plug closing off an end of the piston tube but, instead, feeds directly into the metering volume defined within the piston tube 174. This arrangement of components as seen in alternative damping assembly 170 is only one example of the multitude of different arrangements for the various components that may be used as a damping assembly in one or more embodiments of door closer systems as described herein.

Figure 22:
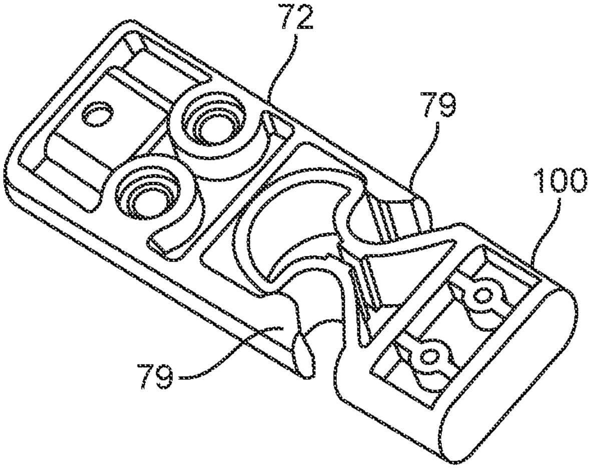
FIG. 22 is a perspective view of one illustrative embodiment of a shoe and retainer plug that may be used in one or more embodiments of a damping assembly of one or more embodiments of a door closer system as described herein.

FIG. 22 is a perspective view of one illustrative embodiment of a shoe 72 and retainer plug 99 that may be used in one or more embodiments of a damping assembly of a door closer system as described herein. The depicted illustrative embodiment of shoe 72 includes a clamping arms 79 configured to capture at least a portion of the retainer plug 100 such that the shoe 72 and retainer plug 100 are connected to each other in a manner that is easily reversible.

Figure 23:
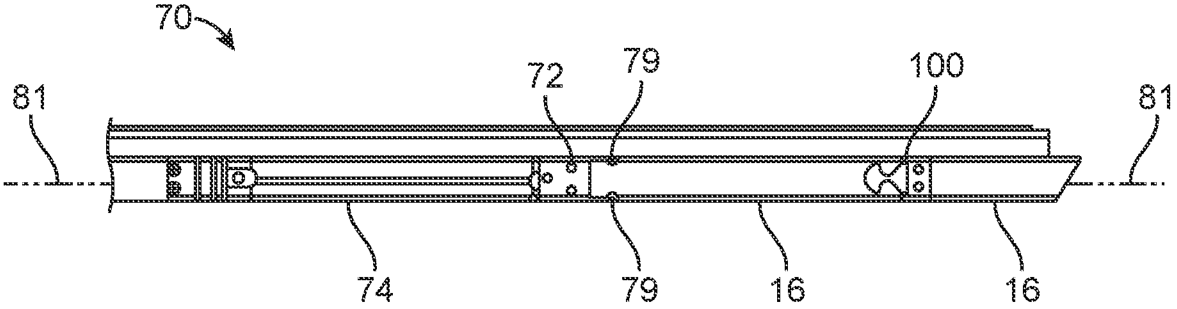
FIG. 23 is a partial cross-sectional view of one illustrative embodiment of a damping assembly in which the shoe depicted in FIG. 22 is spaced apart from the retainer plug.

FIG. 23 is a partial cross-sectional view of one illustrative embodiment of a damping assembly 70 in which the shoe 72 is spaced apart from the retainer plug 100 along the damping axis 81. The damping assembly 70 is, as described elsewhere herein, located within a head jamb 16. In the configuration depicted in FIG. 23, a door connected to the door closer system including damping assembly 70 will typically be in a closed position (see, e.g., FIG. 1).

Figure 24:
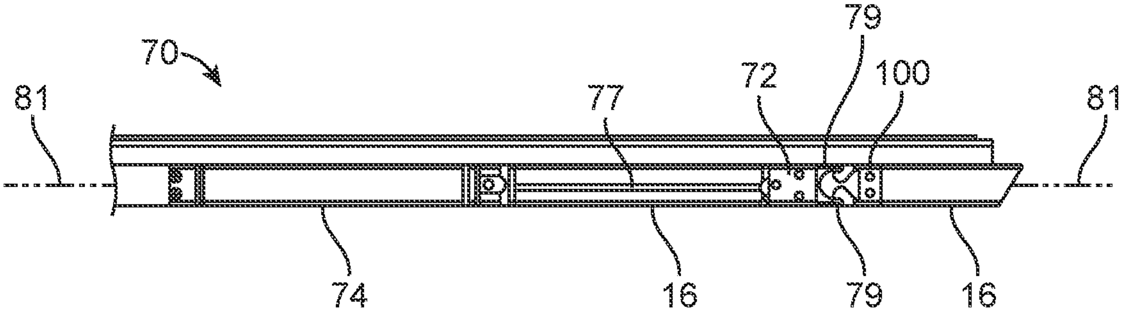
FIG. 24 is a partial cross-sectional view of one illustrative embodiment of a damping assembly in which the shoe depicted in FIG. 22 is engaged with the retainer plug.

FIG. 24 is a partial cross-sectional view of FIG. 23 in which the shoe 72 of the damping assembly 70 has captured the retainer plug 100 such that the shoe 72 and retainer plug 100 are connected to each other. In the configuration depicted in FIG. 24, a door connected to the door closer system including damping assembly 70 will typically be in an open position such as, for example, the door 12 as depicted in FIG. 3. Capture of the retainer plug 100 by the shoe 72 may hold the door in the open position until release and closing of the door is desired.

The complete disclosure of the patents, patent documents, and publications identified herein are incorporated by reference in their entirety as if each were individually incorporated. To the extent there is a conflict or discrepancy between this document and the disclosure in any such incorporated document, this document will control.

Illustrative embodiments of damped door closer systems, door assemblies including the damped door closer systems, and methods are discussed herein with some possible variations described. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof. It should also be understood that this invention also may be suitably practiced in the absence of any element not specifically disclosed as necessary herein.

The invention claimed is:

1. A door closer system comprising:
a closer assembly;
a damping assembly; and
a connecting arm configured to connect the closer assembly to the damping assembly, the connecting arm extending from a first end to a second end along an arm axis, the first end of the connecting arm configured to rotate about a first end axis oriented transverse to the arm axis when the door closer system is installed in a door;
wherein the damping assembly comprises:
a piston tube;
a damper piston in the piston tube, the damper piston configured to move within the piston tube along a damping axis;
a shoe attached to the damper piston and the second end of the connecting arm, the shoe configured to move along the damping axis, wherein the connecting arm is configured to rotate relative to the shoe about a second end axis extending through the second end of the connecting arm and the shoe;
a metering valve configured to allow air to flow into and out of a metering volume in the piston tube, wherein the metering volume is defined by a location of the damper piston relative to the metering valve, wherein the metering volume increases when the damper piston moves within the piston tube in a direction towards the shoe and wherein the metering volume decreases when the damper piston moves within the piston tube in a direction away from the shoe, wherein the metering valve comprises an adjustable orifice configure to allow selective control of a rate of flow of air into and out of the metering volume through the metering valve;

a ball valve located on the damper piston, the ball valve configured to allow air to enter the metering volume through the ball valve when the damper piston moves within the piston tube in a direction towards the shoe, and wherein the ball valve is configured to limit air from leaving the metering volume through the ball valve when the damper piston moves within the piston tube in a direction away from the shoe; and a sliding shuttle operably attached to the damper piston, wherein the sliding shuttle is configured to increase resistance to air flow out of the metering volume when the damper piston is moving away from the shoe to reduce the metering volume.

2. A system according to claim 1, wherein the sliding shuttle is configured to move towards the damper piston when the damper piston is moving away from the shoe to reduce the metering volume, and wherein the sliding shuttle is configured to move away from the damper piston when the damper piston is moving towards the shoe to increase the metering volume;

wherein the sliding shuttle comprises a ball actuator configured to contact a ball of the ball valve when the damper piston is moving away from the shoe to reduce the metering volume;

and wherein the ball actuator is configured to be spaced from the ball of the ball valve when the damper piston is moving towards the shoe to increase the metering volume such that air can enter the metering volume through the ball valve.

3. A system according to claim 2, wherein the sliding shuttle comprises a seal configured to generate friction with an interior surface of the piston tube such that the sliding shuttle resists movement within the piston tube.

4. A system according to claim 1, wherein the metering valve is located in a plug located at an end of the piston tube distal from the shoe.

5. A door assembly comprising:

a door panel;

a door frame configured to at least partially frame a building opening, the door frame assembly comprising a hinge side jamb, a latch side jamb, and a head jamb, wherein the door panel is configured to rotate about a door axis aligned with the hinge side jamb when the door frame and the door panel are assembled in a building opening, the door assembly comprising a closed configuration in which a latch side edge of the door panel is proximate the latch side jamb and an open configuration in which the door panel is rotated about the door axis such that the latch side edge of the door panel is spaced apart from the latch side jamb;

a door closer system configured to close the door panel when the door frame and the door panel are assembled in a building opening and the door panel is in an open configuration, wherein the door closer system comprises a closer assembly, a damping assembly, and a connecting arm configured to connect the closer assembly to the damping assembly, the connecting arm extending from a first end to a second end along an arm axis, the first end of the connecting arm configured to rotate about a first end axis oriented transverse to the arm axis;

wherein the damping assembly comprises:

a piston tube;

a damper piston in the piston tube, the damper piston configured to move within the piston tube along a damping axis;

a shoe attached to the damper piston and the second end of the connecting arm, the shoe configured to move along the damping axis, wherein the connecting arm is configured to rotate relative to the shoe about a second end axis extending through the second end of the connecting arm and the shoe;

a metering valve configured to allow air to flow into and out of a metering volume in the piston tube, wherein the metering volume is defined by a location of the damper piston relative to the metering valve, wherein the metering volume increases when the damper piston moves within the piston tube in a direction towards the shoe and wherein the metering volume decreases when the damper piston moves within the piston tube in a direction away from the shoe, wherein the metering valve comprises an adjustable orifice configure to allow selective control of a rate of flow of air into and out of the metering volume through the metering valve;

a ball valve located on the damper piston, the ball valve configured to allow air to enter the metering volume through the ball valve when the damper piston moves within the piston tube in a direction towards the shoe, and wherein the ball valve is configured to limit air from leaving the metering volume through the ball valve when the damper piston moves within the piston tube in a direction away from the shoe; and a sliding shuttle operably attached to the damper piston, wherein the sliding shuttle is configured to increase resistance to air flow out of the metering volume when the damper piston is moving away from the shoe to reduce the metering volume.

6. A door assembly according to claim 5, wherein the closer assembly is attached to the door panel and the damping assembly is attached to the head jamb such that the shoe is configured to move along the head jamb between the latch side jamb and the hinge side jamb when the door panel is moved between the open configuration and the closed configuration.

7. A door assembly according to claim 5, wherein the sliding shuttle is configured to move towards the damper piston when the damper piston is moving away from the shoe to reduce the metering volume, and wherein the sliding shuttle is configured to move away from the damper piston when the damper piston is moving towards the shoe to increase the metering volume;

wherein the sliding shuttle comprises a ball actuator configured to contact a ball of the ball valve when the damper piston is moving away from the shoe to reduce the metering volume;

and wherein the ball actuator is configured to be spaced from the ball of the ball valve when the damper piston is moving in a direction towards the shoe to increase the metering volume such that air can enter the metering volume through the ball valve.

8. A door assembly according to claim 7, wherein the sliding shuttle comprises a seal configured to generate friction with an interior surface of the piston tube such that the sliding shuttle resists movement within the piston tube.

9. A door assembly according to claim 5, wherein the metering valve is located in a plug located at an end of the piston tube distal from the shoe.

* * * * *